US007167417B2

(12) United States Patent
Akahane et al.

(10) Patent No.: US 7,167,417 B2
(45) Date of Patent: Jan. 23, 2007

(54) TIME CORRECTION SYSTEM, TIME CORRECTION INSTRUCTION DEVICE, POINTER TYPE TIMEPIECE, AND TIME CORRECTION METHOD

(75) Inventors: Hidehiro Akahane, Matsumoto (JP); Osamu Takahashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 325 days.

(21) Appl. No.: 10/752,089

(22) Filed: Jan. 7, 2004

(65) Prior Publication Data

US 2005/0105401 A1 May 19, 2005

(30) Foreign Application Priority Data

Jul. 4, 2003 (JP) ............................. 2003-191996

(51) Int. Cl.
*G04C 11/00* (2006.01)
*G06F 1/04* (2006.01)
*G04B 19/04* (2006.01)

(52) U.S. Cl. ......................... 368/47; 368/155; 368/238

(58) Field of Classification Search .................. 368/47, 368/155, 238, 10, 46, 52
See application file for complete search history.

(56) References Cited

U.S. PATENT DOCUMENTS

| | | | | |
|---|---|---|---|---|
| 5,621,703 A * | 4/1997 | Kanesaka | .................... | 368/47 |
| 5,898,643 A * | 4/1999 | Yasuoka et al. | .............. | 368/47 |
| 6,751,164 B1 * | 6/2004 | Sekiguchi | .................... | 368/80 |
| 6,850,468 B2 * | 2/2005 | Fujisawa et al. | .............. | 368/47 |

FOREIGN PATENT DOCUMENTS

| | | | |
|---|---|---|---|
| DE | 20217587 | U1 | 1/2003 |
| EP | 1316861 | A | 6/2003 |
| JP | 52-068470 | A | 6/1977 |
| JP | 55-033637 | A | 3/1980 |
| JP | 56-158980 | A | 12/1981 |
| JP | 2-010189 | A | 1/1990 |
| JP | 6-258461 | A | 9/1994 |
| JP | 09-061555 | A | 3/1997 |
| JP | 10-062567 | A | 3/1998 |
| JP | 11-190781 | A | 7/1999 |
| JP | 2001-305248 | A | 10/2001 |
| JP | 2002-108634 | A | 4/2002 |
| JP | 2003-255059 | A | 9/2003 |

* cited by examiner

*Primary Examiner*—Kamand Cuneo
*Assistant Examiner*—Jeanne-Marguerite Goodwin
(74) *Attorney, Agent, or Firm*—Global IP Couselors, LLP

(57) ABSTRACT

A time correction system has a timepiece with pointers for displaying the time, and a correction instruction device. The correction instruction device has a timing section for timing reference time data, a time input section for inputting pointed time data corresponding to the time indicated by the pointers, a comparison section for comparing the reference time data and the pointed time data, and a communication section for outputting a correction instruction signal based on the results of this comparison to the pointer type timepiece. The pointer type timepiece has an external signal detection circuit for receiving the correction instruction signal, a drive control section for controlling the driving of the pointers, and a time correction control circuit for matching the readings of the pointers with the reference time data based on the received correction instruction signal.

13 Claims, 17 Drawing Sheets

TIME CORRECTION SYSTEM, TIME CORRECTION INSTRUCTION DEVICE, POINTER TYPE TIMEPIECE, AND TIME CORRECTION METHOD

BACKGROUND OF THE INVENTION

1. Field of the Invention

The present invention relates to a time correction system, a time correction instruction device, a pointer type timepiece, and a time correction method. More specifically, the present invention relates to a time correction system, a time correction instruction device, a pointer type timepiece, and a time correction method configured such that the pointer type timepiece and the time correction instruction device are in a communicable state, and the instructed time is automatically corrected in the pointer type timepiece.

2. Background Information

Date-displaying pointer type timepieces that display the time by the positions of rotating pointers and also display the date by a rotating date disc with numerals or the like on the date disc are known in conventional practice. A silver battery or another such primary battery is provided in a date-displaying pointer type timepiece to drive the timepiece itself. Therefore, for example, when the battery runs out of power and needs to be replaced, the timepiece is taken to a timepiece store, where a store staff opens the back lid of the timepiece to replace the battery and also adjusts the time displayed by the pointers and the displayed date.

There are also date-displaying pointer type timepieces that have so-called auto-calendar functions for automatically correcting the date displayed by the date disc when one calendar month has 30 or 31 days or when a leap year occurs. A primary battery is also used in such timepieces, and the time and date are adjusted along with a battery replacement similar to the previous description when the battery runs out of power, and, furthermore, the year is also adjusted due to the setting of the auto-calendar functions.

Regardless of whether these auto-calendar functions are present, the time, date, and year are generally adjusted in such timepieces by operating winders, buttons, or the like. However, such adjustment procedures have been troublesome because winders, buttons, or the like, which are relatively small elements, must be used, and the adjustment procedures have been extremely complicated. Therefore, when a plurality of timepieces needing battery replacements are brought in, much time is required for date and time adjustment procedures accompanying battery replacements, and the timepieces are not returned to the user on time.

With a timepiece equipped that has an auto-calendar function, as previously described, the year must also be adjusted when replacing the battery, and the mechanism, method, and other adjustment aspects involving winders or buttons has become complicated. Therefore, to improve on this problem, for example, Japanese Laid-Open Patent Publication No. 9-61555 discloses a technique for correcting the date displayed by the date disc in a timepiece via an internal date correction circuit by providing the inside of the back lid of the timepiece with liquid crystal display devices or switches for correcting the date, and inputting the correct year, month, and day using these liquid crystal display devices or switches. However separate liquid crystal display devices and switches are provided for date correction in this case, so the number of liquid crystal panels, circuits, pressure plates, and other such members increases, which leads to problems related to rising costs of the timepiece, increases in size, and the like. Also, the back lid must be opened to correct the date even when the counter with the date information is reset by an operation involving static electricity or the like, and the date is corrected for some reason other than battery replacement, which has caused problems of poor operating efficiency.

Furthermore, as shown in Japanese Laid-Open Patent Publication No. 11-190781, a drive device for driving the minute, hour, and second pointers and the date disc is often separately installed in order to provide the auto-calendar function, in which case a switch for detecting the fact that the minute, hour, and second pointers are at 12:00 AM must be provided, which has been disadvantageous in terms of the size of the timepiece, the number of components, the cost of assembly procedures, and the like.

Also, Japanese Laid-Open Patent Publication No. 10-62567 discloses a device wherein a configuration unit for setting the auto-calendar function is mounted on the inside of the back lid of the timepiece, and the displayed date and time are corrected by writing the time and a calendar as the calendar information into the configuration unit with a pencil or the like. However, this case necessitates space for mounting the configuration unit, which hinders size reduction of the timepiece. Although the possibility of reducing the size of the configuration unit has also been considered, this approach would be inconvenient in that setting would become more difficult to accomplish. Furthermore, the setting method itself is not necessarily simple, so the manual needs to be consulted, which may lead to a more complex procedure.

A configuration wherein specific buttons for correcting the date are provided separately to exterior parts has also been considered, but problems of increased cost due to the increase in the number of elements have occurred in this case, and problems of damaging the appearance have occurred particularly in the case of wristwatches and other design-oriented products.

In view of the above, it will be apparent to those skilled in the art from this disclosure that there exists a need for improved time correction system, time correction instruction device, pointer type timepiece, and time correction method. This invention addresses this need in the art as well as other needs, which will become apparent to those skilled in the art from this disclosure.

SUMMARY OF THE INVENTION

One object of the present invention is to provide a time correction system in which the time can be corrected with a simple procedure without mounting external buttons or making any other such modifications to minimize the increase in size and cost of a timepiece.

In order to achieve this and other objects, a time correction system in accordance with the present invention comprises a pointer type timepiece and a time correction instruction device. The pointer type timepiece includes at least one pointer, a communication section, a drive control section and a correction section. The at least one pointer is configured to display time. The communication section is configured to receive time adjustment data. The drive control section is configured to control driving of the at least one pointer. The correction section is configured to operate the drive control section based on the time adjustment data. The time correction instruction device includes a timing section, a time input section and a communication section. The timing section is configured to keep time as reference time data. The time input section is configured to input pointed time data corresponding to time indicated by the at least one pointer of the pointer type timepiece. The communication section is configured to output the time adjustment data to the pointer type timepiece. One of the pointer type timepiece and the time correction instruction device further includes a comparison section configured to compare the reference time data and the pointed time data.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
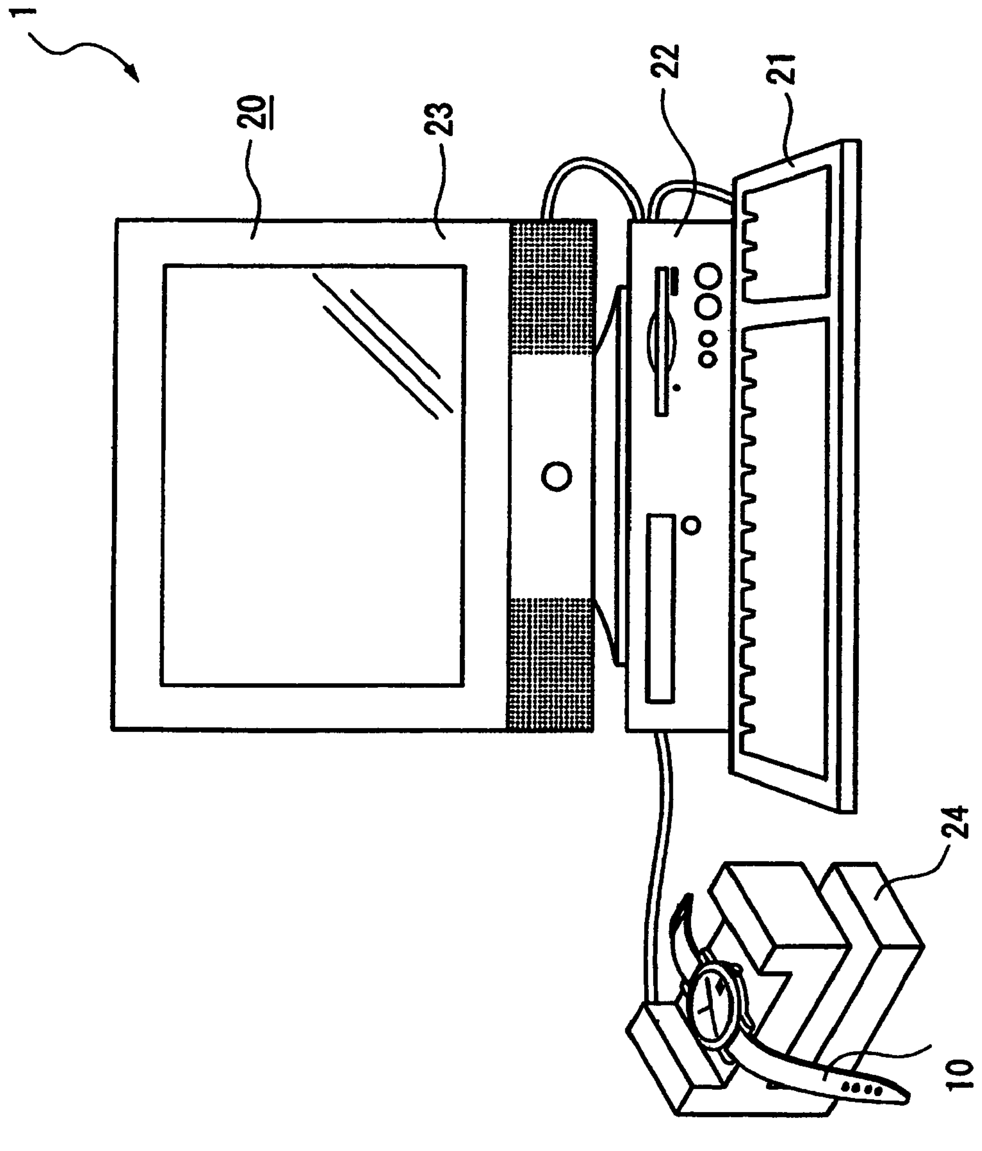
FIG. 1 is a schematic diagram showing the date/time correction system in accordance with a first embodiment of the present invention.

Referring to FIGS. 1 through 7, a time correction system will be described herein according to the first embodiment of the present invention. FIG. 1 is a diagram showing the date/time correction system 1 in accordance with the first embodiment of the present invention. As shown in FIG. 1, the date/time correction system 1 has a timepiece 10 as a pointer-type timepiece having a date/time display function, and a correction instruction device 20 as a time correction instruction device for correcting the displayed time and date (date and time) of the timepiece 10. According to the time correction system in accordance with the first embodiment of the present invention, for example, an operator in a timepiece store opens the back lid of the timepiece 10 to replace the battery, then inputs the instruction time from the time input section of the time correction instruction device 20 while looking at the pointers on the dial. In the process, the communication section of the pointer type timepiece 10 and the communication section of the time correction instruction device 20 are kept in communication with each other. For example, the communication section of the pointer type timepiece 10 and the communication section of the time correction instruction device 20 are connected by a communication wire. Together with the pointed time data thus inputted, the reference time data timed by the timing means is then outputted by the time correction instruction device 20 to the pointer type timepiece 10 through the communication section. These pieces of data are subsequently received by the communication section in the pointer type timepiece 10, the reference time data and pointed time data thus received are compared by a comparison section, and the pointer indications are matched with the reference time data by the correction section based on the comparison results. Therefore, in the present embodiment, the pointed time data and the reference time data basically constitute time adjustment data. The time of the pointer-type timepiece is corrected as described above. Therefore, the operator merely inputs the instruction time of the pointer type timepiece 10 while the pointer type timepiece 10 and the time correction instruction device 20 are kept in communication with each other, after which the instruction time is automatically corrected in the time correction instruction device 20 and the pointer type timepiece 10. The operator can thus simply correct the time without operating winders, buttons, or the like, and can conduct procedures efficiently even when many timepieces are to be corrected.

In the present embodiment, reference time data was described with reference to a computer (PC) as the correction instruction device 20, but a device capable of functioning as a so-called wave clock, which corrects the time by receiving electromagnetic waves that include standard time information, can also be employed. The reference time data can be obtained as data received via a phone line, as received electromagnetic waves that contain the reference time data, or as data obtained using a service wherein the time information is carried by the electromagnetic signal of a portable phone. Also, a quartz timepiece function can be provided to the correction instruction device 20, and the time of the timepiece function can be used as reference time data. Furthermore, a method or service for setting the reference time of a time correction instruction device containing a computer or the like can be employed via an Internet line or another such communication line by using NTP (Network Time Protocol) or the like.

Figure 2:
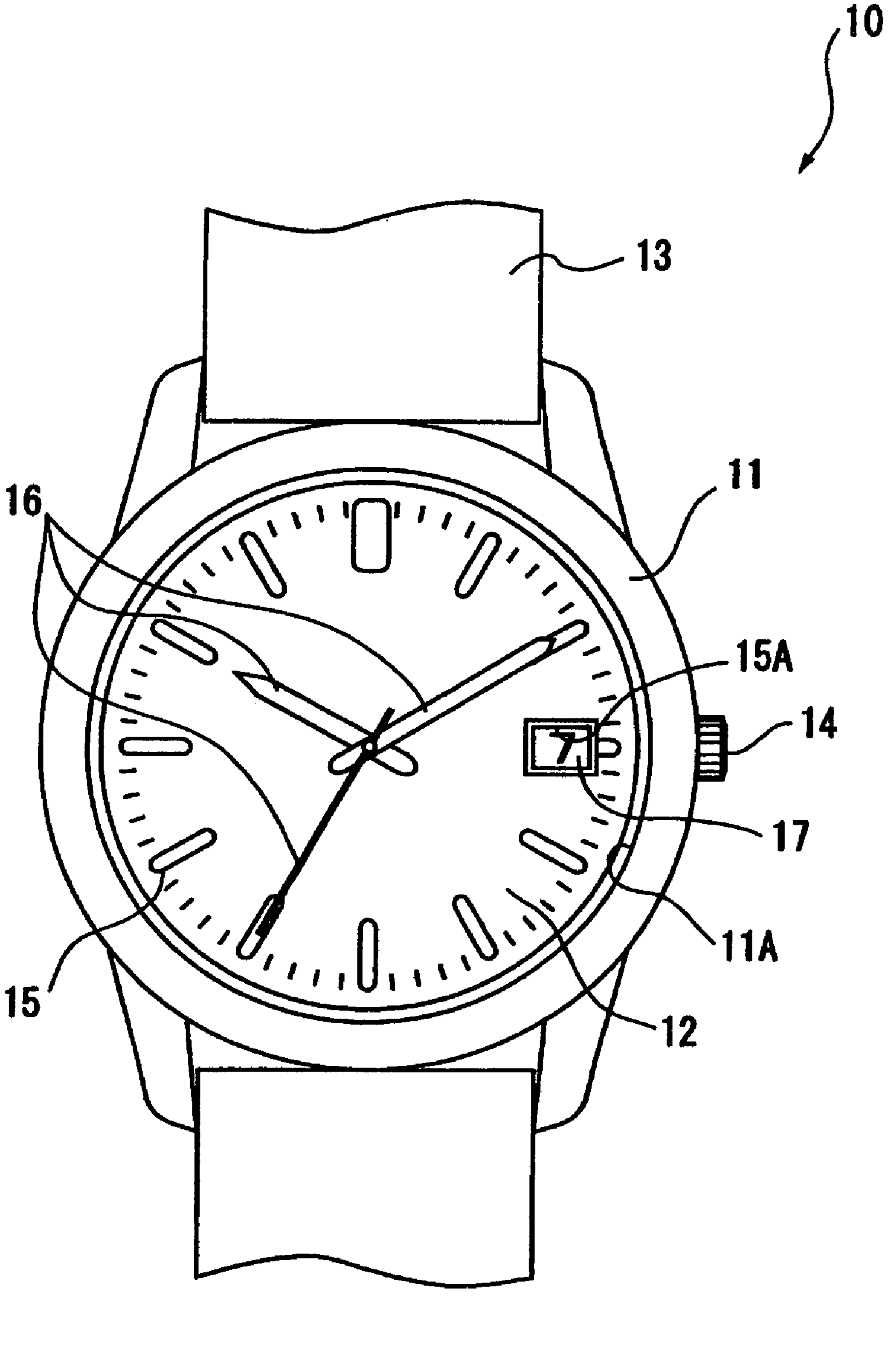
FIG. 2 is a diagram showing the display section of the timepiece in accordance with the first embodiment of the present invention.

FIG. 2 is a diagram showing the display section of the timepiece 10. The timepiece 10 is a wristwatch-type timepiece with pointers, and has a resinous or metallic main body case 11 made of a circular casing with the front and rear faces open, a crystal glass 12 fixed to the opening 11A on the surface side of the main body case 11, a back lid (not shown) fixed to the opening on the reverse side of the main body case 11, and a band 13 fixed to the main body case 11 and designed for mounting the timepiece on the wrist or the like of the user. A timepiece having a function for displaying the date by mans of a date disc, a timepiece having a so-called auto-calendar function, or a timepiece without these date-displaying functions can be employed as the pointer type timepiece 10. The pointers consist of an hour hand, a minute hand, a second hand, or the like, and may be shaped as regular pointers or as circular plates with gradations. In the present embodiment, a wristwatch-type pointer-type timepiece was described as an example of the timepiece 10, but it will be made clear to those skilled in the art by the disclosures of the present invention that the time correction system of the present invention is not limited solely to correcting the time on wristwatch-type timepieces and can be applied to timepieces of various configurations, such as standing clocks and the like.

In the partial diagram shown in FIG. 2, the main body case 11 is provided with a movement constituting the main body section of the timepiece, and a winding shaft wherein one end is connected to the movement and the other end is exposed from the side of the main body case 11. The other end of the winding shaft is provided with a winder 14 for time correction. The winder 14 is positioned on the side of the main body case 11. Also, a dial 15 positioned on the inner side of the crystal glass 12 and designed for displaying the date and time, pointers 16 that rotate between the dial 15 and the crystal glass 12, and a ring-shaped date disc 17 are installed inside the main body case 11. The surface side of the date disc 17 is inscribed with the numerals 1 through 31 for displaying the date. Also, a date window 15A for displaying the numerals that indicate the date and are visible from the outside is formed on part of the dial 15.

Figure 3:
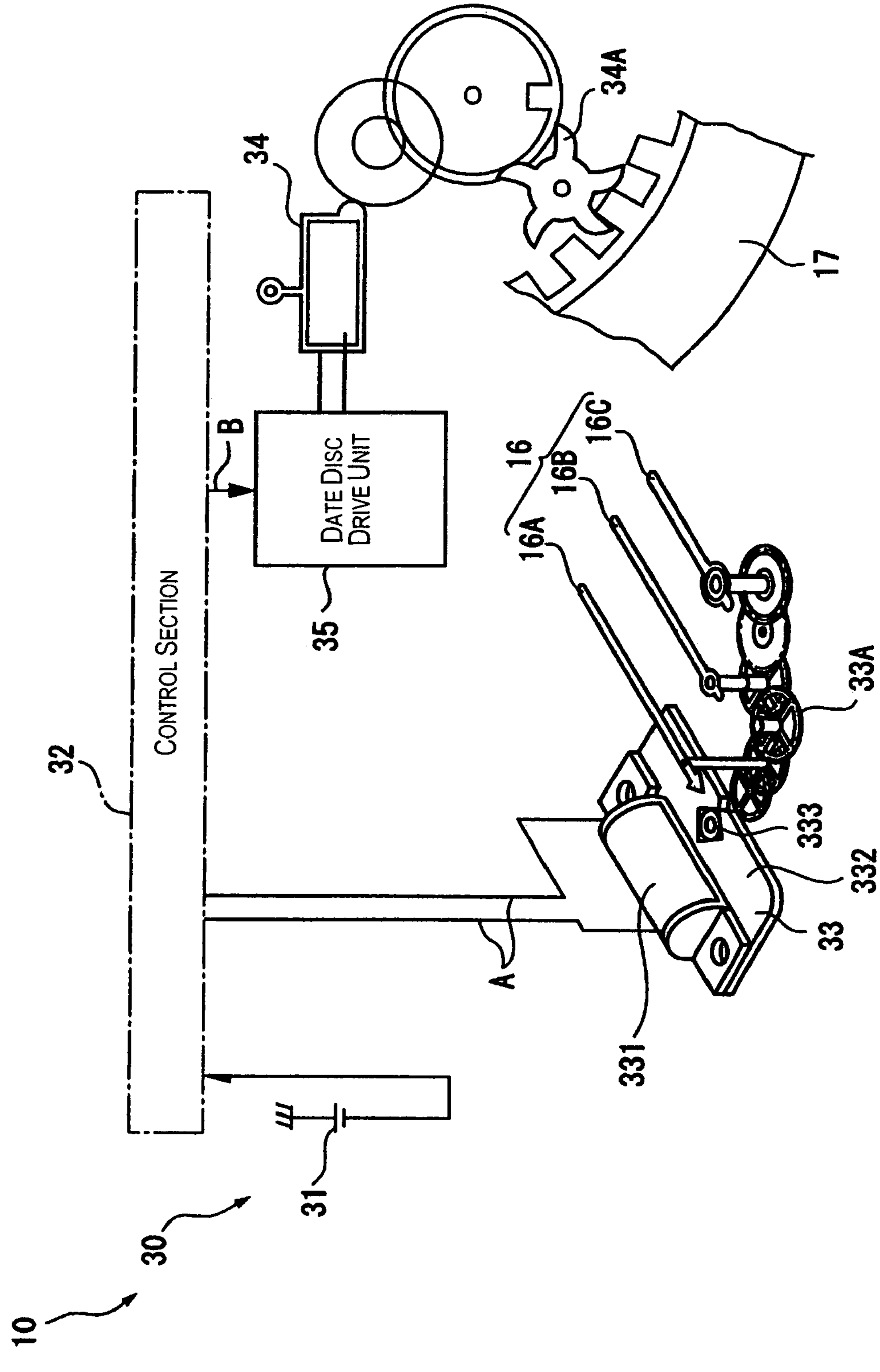
FIG. 3 is a schematic diagram showing the configuration of the movement of the timepiece in accordance with the first embodiment of the present invention.
Figure 4:
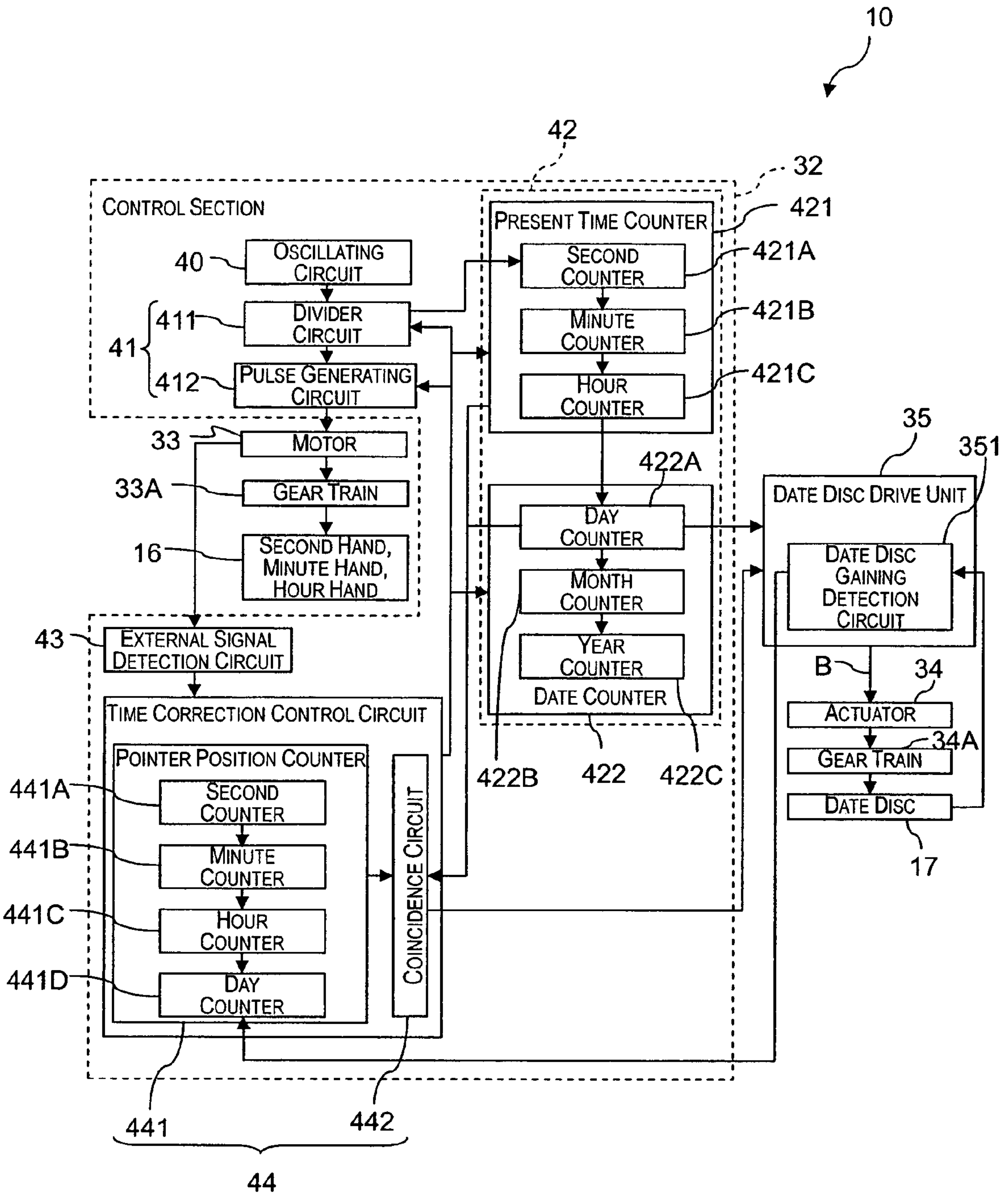
FIG. 4 is a block diagram showing the function of the movement in accordance with the first embodiment of the present invention.

FIG. 3 is a schematic diagram showing the configuration of the movement of the timepiece 10. FIG. 4 is a block diagram primarily showing the function of this movement. As shown in FIG. 3, the movement 30 has a silver battery or another such primary battery 31, a control section 32 for controlling the driving of the entire apparatus by electric power from the primary battery 31, a stepping motor 33 as a motor whereby the pointers 16 for displaying the time are rotated via a gear train 33A, a piezoelectric actuator 34 whereby the date disc 17 for displaying the date is rotated via a gear train 34A, and a date disc drive unit 35 for receiving a drive control signal from the control section 32 and driving the piezoelectric actuator 34.

The stepping motor 33 has a motor coil 331, a stator 332 made from Permalloy or the like, and a rotor 333, and the motor coil 331 receives a pulse signal A outputted from the control section 32, converts the received pulse signal A first to a magnetic signal and then to rotational movement via the stator 332 and the rotor 333, and controls the rotation of the gear train 34A. The motor coil 331 of this stepping motor 33 is used as receiving means for receiving (detecting) the data for date/time correction. In other words, in the present embodiment, the motor coil 331 forms part of the communication section of the pointer type timepiece 10.

The gear train 33A is configured from a plurality of small and large toothed gears, and the rotating movement of the rotor 333 is converted to a specific number of rotations and transmitted by these toothed gears.

The pointers 16 are fixed to the toothed gears of the gear train 33A to rotate at a constant speed in conjunction with the toothed gears and to indicate the time on the dial 15. The pointers include a second hand 16A, a minute hand 16B, and an hour hand 16C.

The date disc drive unit 35 receives a drive control signal B outputted from the control section 32, and applies a specific voltage to the piezoelectric actuator 34.

The piezoelectric actuator 34 is deformed upon receipt of the applied voltage from the date disc drive unit 35, the gear train 34A in contact with the tip of the bent surface is caused to rotate, and the date disc 17 is rotated in controlled fashion.

As shown in FIG. 4, the control section 32 has an oscillating circuit 40, a drive control section or drive control means 41, a counter 42, a communication section or an external signal detection circuit 43 as communication means, and a time correction control circuit 44. Although electromagnetic induction is used as the communication means in the present embodiment, it is also possible, for example, to use infrared data communication, communication through an electric connection from a USB (Universal Serial Bus), SCSI, or the like, optical communication, acoustic (ultrasonic) communication, and various other types of interfaces.

The oscillating circuit 40 has a reference oscillation source comprising a crystal transducer, which outputs a reference pulse.

The drive control means 41 controls the driving of the pointers 16, and has a divider circuit 411 that inputs the reference pulse outputted from the oscillating circuit 40, and generates pulses with various frequencies based on the reference pulse. The drive control means 41 also includes a pulse generating circuit 412 that generates a motor drive pulse for driving the stepping motor 33 based on the pulse outputted from the divider circuit 411. Also, the divider circuit 411 outputs a pulse with a specific frequency to the pulse generating circuit 412 based on the signal inputted from the time correction control circuit 44. For example, the divider circuit 411 switches between 1-Hz pulses and 256-Hz pulses, and outputs pulses for normal pointer movement or pulses for fast-forwarding.

The counter 42 has a present time counter 421 for counting the present time based on the reference pulse inputted from the divider circuit 411, and a date counter 422 for counting the date based on the value of the present time counter 421.

The present time counter 421 has a function whereby timing with a modified date can be assumed by counting the present time, and this counter also has a second counter 421A for counting seconds as part of the time display, a minute counter 421B for counting minutes, and an hour counter 421C for counting hours. The second counter 421A counts the 1-Hz pulses outputted from the divider circuit 411, and is a counter that loops every 60 seconds. The minute counter 421B performs counting by inputting a signal based on the loop of the second counter 421A, and is a counter that loops every 60 minutes. The hour counter 421C performs counting by inputting a signal based on the loop of the minute counter 421B, and is a counter that loops every 24 hours.

The date counter 422 is a counter that accurately corrects the date display, including the end of the month, by counting the years, months, and days, and that has a day counter 422A for counting days as part of the date, a month counter 422B for counting months, and a year counter 422C for counting years. The day counter 422A performs counting by inputting a signal based on the loop of the hour counter 421C, and is a counter that loops every 31 days. The month counter 422B performs counting by inputting a signal based on the loop of the day counter 422A, and is a counter that loops every 12 months. The year counter 422C performs counting by inputting a signal based on the loop of the month counter 422B, and is a counter that counts every leap year, or, specifically, loops every four years. In this case, a calculation is performed based on a certain year after the leap year in the correction instruction device 20, and the timepiece 10 can be configured to receive the results of this calculation and set the year to any of the numerals 0 through 3 based on the results of this calculation. The year counter 422C may also loop every 9999 years.

The date disc drive unit 35 drives the piezoelectric actuator 34 based on the signal outputted from the day counter 422A, and the piezoelectric actuator 34 drives the date disc 17 via the gear train 34A. The date disc drive unit 35 has a date disc gaining detection circuit 351 for detecting whether or not the reading on the timepiece has been caused to be one day ahead by the piezoelectric actuator 34.

The external signal detection circuit 43 receives the data inputted from the correction instruction device 20 and other such external devices (pointed date/time data hereinafter described, reference time data, and reference date data) via the motor coil 331 of the stepping motor 33, shapes the waveform of the received data to convert it into a digital signal, and outputs the result to the time correction control circuit 44.

The time correction control circuit 44 stores part of the data inputted from the external signal detection circuit 43 in memory, writes the other remaining data into the present time counter 421 and the date counter 422, and corrects the time and date indicated by the timepiece 10. The time correction control circuit 44 has a pointer position counter 441 and a coincidence circuit 442. Also, the time correction control circuit 44 has functions whereby the driving (movement) of the pointers 16 is stopped and the lower frequencies of the divider circuit 411, for example, frequencies less than 128 Hz, are reset during a time correction.

The pointer position counter 441 inputs pointed date/time data (days, hours, minutes, and seconds) from the external signal detection circuit 43 and performs forward counting in synchronism with the driving of the stepping motor 33, with the inputted pointed date/time data serving as an initial value. The pointer position counter 441 has a second counter 441A for counting seconds as part of the time count, a minute counter 441B for counting minutes, an hour counter 441C for counting hours, and a day counter 441D for counting days. The second counter 441A is a counter that loops every 60 seconds. The minute counter 441B performs counting by inputting a signal based on the loop of the second counter 441A, and is a counter that loops every 60 minutes. The hour counter 441C performs counting by inputting a signal based on the loop of the minute counter 441B, and is a counter that loops every 24 hours. The day counter 441D performs counting by inputting a signal based on the detection of the date disc gaining detection circuit 351 of the date disc drive unit 35, and is a counter that loops every 31 days.

The coincidence circuit 442 compares the reference time data counted by the present time counter 421 and the pointed time data counted by the pointer position counter 441, and inputs a correction instruction signal based on the results of the comparison to the drive control means 41. The divider circuit 411 switches the pulse outputted from the pulse generating circuit 412 to a fast-forwarding frequency based on the inputted correction instruction signal, and the pulse generating circuit 412 outputs the switched fast-forwarding pulse to the stepping motor 33. The stepping motor 33 then receives the fast-forwarding pulse and fast-forwards the pointers 16. Also, the second counter 441A performs forward counting based on a pulse output signal from the pulse generating circuit 412 or a pulse generating command signal from the pulse-generating divider circuit 411.

Also, the coincidence circuit 442 outputs a correction signal based on the comparison results to the date disc drive unit 35, and the date disc drive unit 35 that received this signal outputs a fast-forwarding signal that drives the piezoelectric actuator 34 and fast-forwards the date disc 17. The speeding detection circuit 351 then detects the driving of the date disc 17 and outputs the detection results to the day counter 441D, and the day counter 441D to which the detection results are inputted performs forward counting. The coincidence circuit 442 repeats the operation described above until the comparison results of both pieces of data eventually coincide.

The drive control means 41 and date disc drive unit 35 function as a correction section or correction means. Also, the time correction control circuit 44 and counter 42 function as a comparison section or comparison means. Thus, the configuration can be simplified and the pointer type timepiece 10 can be reduced in weight and size because a present time counter is provided to the pointer type timepiece 10 and because the pointer position counter 441 and coincidence circuit 442 are merely provided to the correction means of the pointer type timepiece 10 as a software package.

Returning to FIG. 1, the time correction instruction device 20 has a keyboard 21 as an input section or input means used to input characters and the like; a computer main body 22 including a CPU, hard disk, or the like; a monitor 23 as a display section for displaying the inputted characters and the like; and a cradle-style timepiece setting stand 24 in which the timepiece 10 is set. The computer main body 22 and the timepiece setting stand 24 are electrically connected. In the present embodiment, the time correction instruction device 20 is configured as the computer 22, so using the keyboard 21 as the time input means allows the operator who performs the corrections to operate with ease and in relatively familiar environment. Also, configuring the time correction instruction device 20 merely by incorporating a program into the computer 22 can yield a simpler configuration in comparison with providing a dedicated time correction instruction device.

Figure 5:
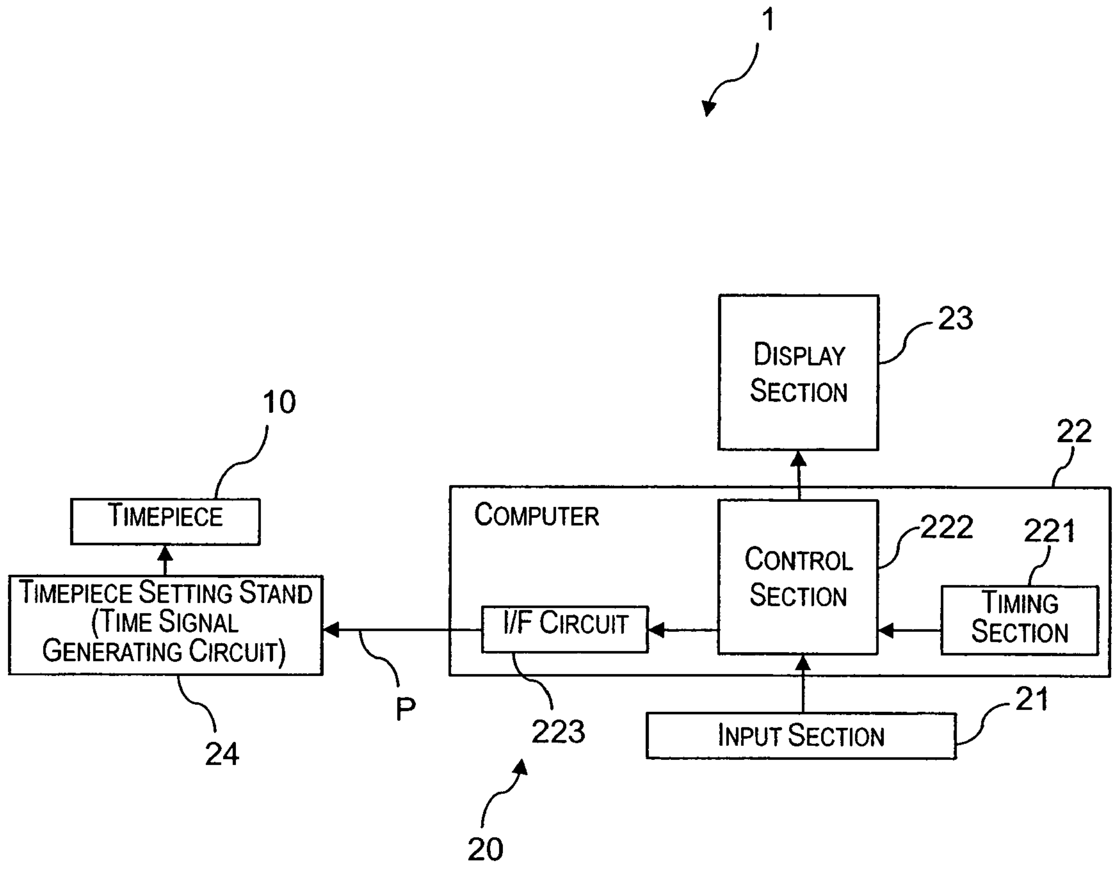
FIG. 5 is a block diagram showing the functions of the correction instruction device in accordance with the first embodiment of the present invention.

FIG. 5 is a block diagram showing the functions of the correction instruction device 20. As shown in FIGS. 1 and 5, the keyboard 21 functions as time input means (a time input section) for inputting the pointed time data indicated by the pointers 16 of the timepiece 10 and the date data indicated by the date disc 17.

Figure 6:
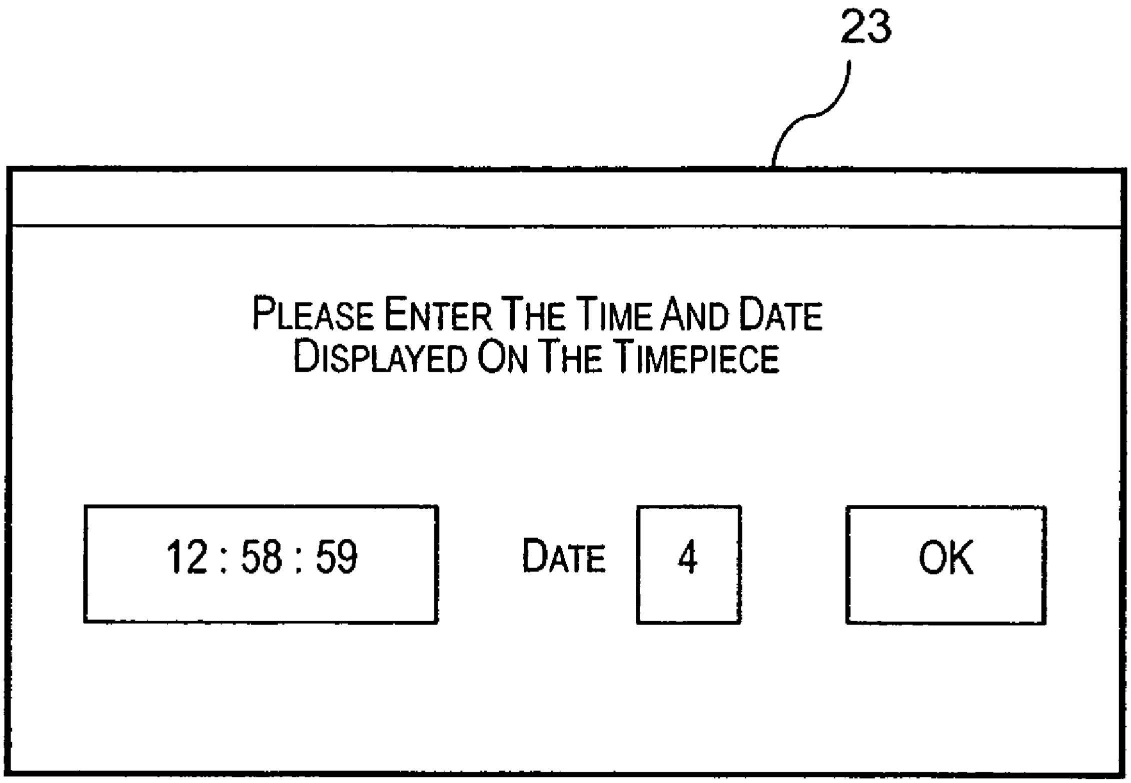
FIG. 6 is a simplified diagram showing the display screen of a monitor in the date/time correction system in accordance with the first embodiment of the present invention.

FIG. 6 is a diagram showing the display screen of the monitor 23 when the pointed time data and pointed date data are inputted from the keyboard 21. For example, as shown in FIG. 6, 12 hours, 58 minutes, and 59 seconds (12:58:59) is inputted as the pointed time data, and 4 days is inputted as the pointed date data with the keyboard 21.

Returning to FIG. 5, the computer main body 22 has a timepiece section 221 as timing means for keeping the time of the reference date/time data that indicates the reference date and time, a control section 222 for controlling the entire computer, and an interface circuit (I/F circuit) 223 for converting the reference time/date data of the timepiece section 221 and the inputted pointed time data and pointed date data to a data signal P capable of being externally outputted. The timepiece setting stand 24 contains a magnetic field generating circuit or another circuit with an integrated coil, and is a cradle-style stand that functions as a communication section or communication means for outputting the data signal P outputted from the I/F circuit 223 to the set timepiece 10. As described above, electromagnetic induction is used as the communication means in the present embodiment, but it is also possible, for example, to use infrared data communication, communication through the electric connection from a USB (Universal communication, and various other types of interfaces.

Figure 7:
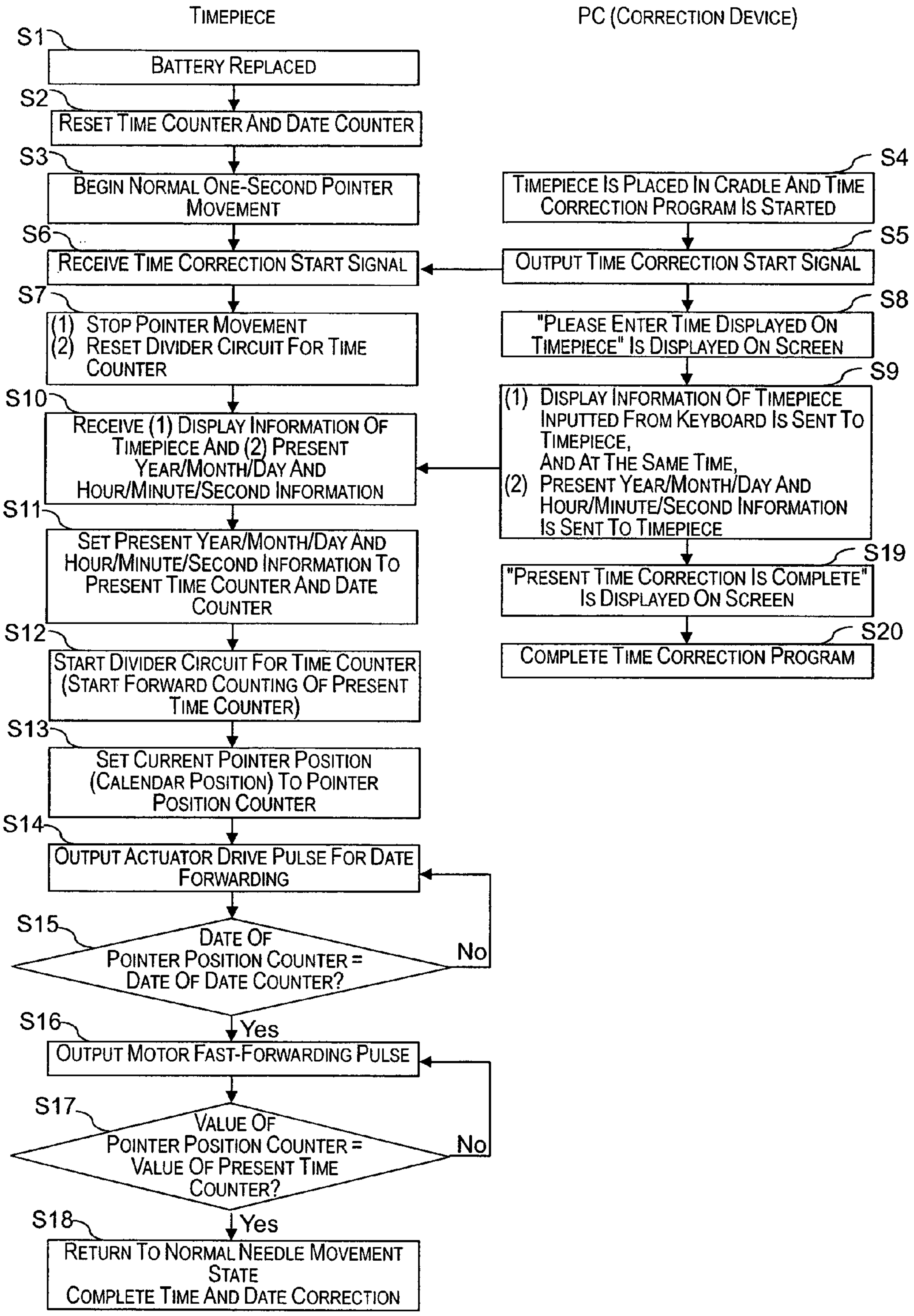
FIG. 7 is a flowchart showing the date/time correction procedure of the timepiece in accordance with the first embodiment of the present invention.

FIG. 7 is a flowchart showing the procedure for correcting the date/time of the timepiece in a timepiece store. First, the operator in the timepiece store removes the back lid of the timepiece 10, takes out the primary battery 31 from the inside, and replaces the battery with a new battery (step S1). The present time counter 421 and date counter 422 are reset simultaneously with this battery replacement (step S2), and the timepiece 10 begins pointer movement in one-second increments (step S3) in the usual manner.

Next, the operator sets the timepiece 10 in the timepiece setting stand 24 and starts up the date/time correction program of the correction instruction device 20 (step S4), whereupon a signal for starting date/time correction is sent by the correction instruction device 20 to the timepiece 10 through the timepiece setting stand 24, which is a communication section or communication means (step S5). The signal for starting date/time correction is received by the external signal detection circuit 43 in the timepiece 10 (step S6), and the pointer movement then stops in a state in which the divider circuit 411 for counting 1-Hz increments at 128 Hz or less is reset in this divider circuit 411 (step S7).

Next, the words "Please enter the time and date displayed on the timepiece" are displayed on the monitor 23 in the correction instruction device 20 (step S8). The operator accordingly inputs the pointed time data, which is the displayed time of the timepiece 10, and the pointed date data (display information), which is the displayed date, from the keyboard 21 (time input procedure).

Next, the pointed time data and pointed date data of the timepiece 10 inputted by means of the keyboard 21 in the correction instruction device 20 are sent to the timepiece 10, and the reference date/time data (present year/month/day and hour/minute/second information) counted by the timepiece section 221 is also sent to the timepiece 10 (step S9: communication procedure).

The external signal detection circuit 43 in the timepiece 10 receives the reference date/time data (present year/month/day and hour/minute/second information) and the pointed date data (day) or the pointed time data (hour/minute/second) outputted from the correction instruction device 20 or (step S10: receiving procedure). The reference time data (present hour/minute/second) from the reference date/time data is then set by the present time counter 421 in the timepiece 10, and the reference year/month/day data (present year/month/day) is set in the date counter 422 by means of the time correction control circuit 44 (step S11).

The divider circuit 411 for counting 1-Hz intervals (seconds) starts next, and the present time counter 421 is caused to start counting by the time correction control circuit 44 in the timepiece 10 (step S12). Also, the pointed time data (hour/minute/second) and the pointed date data (day) received from the correction instruction device 20 are set by the pointer position counter 441 in the timepiece 10 by means of the time correction control circuit 44 (step S13).

Next, the value of the day counter 441D of the pointer position counter 441 and the value of the day counter 422A of the date counter 422 are compared by the coincidence circuit 442 in the timepiece 10, and the date disc drive unit 35 outputs a fast-forwarding signal for driving the piezoelectric actuator 34 (actuator drive pulse for date forwarding) to fast-forward the date disc 17 based on a correction instruction signal based on the results of this comparison (step S14: comparison means, correction means). The date disc gaining detection circuit 351 detects the driving of the date disc 17 and outputs the detection results to the day counter 441D to cause the day counter 441D to count forward based on the speeding up results (step S15).

Also, the values of the counters 441A to 441C of the pointer position counter 441 are compared with the values of the 421A to 421C of the present time counter 421 by the coincidence circuit 442, the divider circuit 411 switches the pulse outputted from the pulse generating circuit 412 to a fast-forwarding frequency based on a correction instruction signal based on the results of this comparison, and the pulse generating circuit 412 outputs the switched fast-forwarding pulse (motor fast-forwarding pulse) to the stepping motor 33 (step S16: comparison means, correction means). The stepping motor 33 receives this motor fast-forwarding pulse to fast-forward the pointers 16, and causes the pointer position counter 441A of the time correction control circuit 44 to count forward. This operation is repeated until the comparison results of both pieces of data coincide (step S17).

As described above, the timepiece 10 corrects both the time and date and returns to the normal pointer movement state (step S18). In the correction instruction device 20, the words "The present time has been corrected" are displayed on the monitor 23 (step S19), and the time correction program is complete (step S20). Finally, the operator separates the timepiece 10 from the state of communication with the timepiece setting stand 24, sets the next timepiece in the timepiece setting stand 24, and corrects the time and date again.

Specifically, in the invention described above, for example, the operator in the timepiece store opens the back lid of the pointer type timepiece 10 to replace the battery, and then inputs the instruction time from the time input means of the time correction instruction device 20 while looking at the pointers on the dial. In the process, the communication means of the pointer type timepiece 10 and the communication means of the time correction instruction device 20 are kept in communication with each other. For example, the communication means of the pointer type timepiece 10 and the communication means of the time correction instruction device 20 are connected by a communication wire. The reference time data timed by the timing means, and the pointed time data thus inputted are then compared by the comparison means in the time correction instruction device 20, and a correction instruction signal based on the results of this comparison is outputted to the pointer type timepiece from the communication section. Next, this correction instruction signal is received by the communication means in the pointer type timepiece 10, and the pointer indications are matched with the reference time data by the correction means based on the received correction instruction signal. The time of the timepiece 10 is thus corrected as described above.

According to the present invention, the operator merely inputs the instruction time of the pointer type timepiece 10 while the pointer type timepiece 10 and the time correction instruction device 20 are kept in communication with each other, and then the instruction time is automatically corrected in the time correction instruction device 20 and the pointer type timepiece 10. Therefore, the operator can easily correct the time without operating winders, buttons, or the like, and can perform operations efficiently even when many timepieces are to be corrected. Also, since only a communication means for receiving data is provided to the pointer type timepiece 10, the timepiece can be made smaller and less expensive in comparison with providing a liquid crystal device or the like, and there is no need to make significant modifications to the outer visible configuration of the timepiece.

According to the present embodiment, the following effects can primarily be obtained.

(1) The operator merely inputs the instruction time of the timepiece 10 while the timepiece 10 and the correction instruction device 20 are kept in communication with each other, whereby the instruction time and date are automatically corrected in the correction instruction device 20 and timepiece 10. Therefore, the operator can easily correct the time without operating winders, buttons, or the like, and can perform operations efficiently even when many timepieces 10 are to be corrected.

(2) The timepiece can be made smaller and less expensive because there is no need to incorporate receiver elements into the timepiece 10 due to the fact that external data can be received using the motor coil 331 of the stepping motor 33 for driving the pointers 16.

(3) The pointer type timepiece 10 can be manufactured at low cost and with a minimal increase in the number of components because there is no need to incorporate new components due to the fact that the motor coil 331 of the stepping motor 33 is used and that correction means and comparison means are incorporated into the IC components of the timepiece 10.

(4) Configuring the timepiece such that the time indicated by the pointers 16 and the date indicated by the date disc 17 can be automatically corrected allows correction to be performed more efficiently compared with a timepiece that has an auto-calendar function.

(5) Configuring the correction instruction device 20 with a computer is effective because of the following advantages: the computer is easy to use as a correction instruction device because it has a perpetual calendar; the circuits connected with the timepiece 10 are easy to install using an existing interface; the familiar keyboard can be used to input the time and the like; correction-related operations and the like are displayed on the monitor to make the operations simple, and the like.

Second Embodiment

Referring now to FIGS. 8 through 11, a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The date/time correction system 2 in accordance with the second embodiment has a substantially similar external appearance as the date/time correction system 1 of the first embodiment shown in FIG. 1, but the internal configuration of the components is different.

The date/time correction system 2 has a pointer type timepiece 50 with a date display function, and a correction instruction device 60 as a time correction instruction device for correcting the time and date (date/time) displayed by the timepiece 50. The timepiece 50 and the time correction instruction device 60 in accordance with the second embodiment have substantially similar external appearances as the timepiece 10 and the time correction instruction device 20 in accordance with the first embodiment shown in FIG. 1, but the internal components are different.

Figure 8:
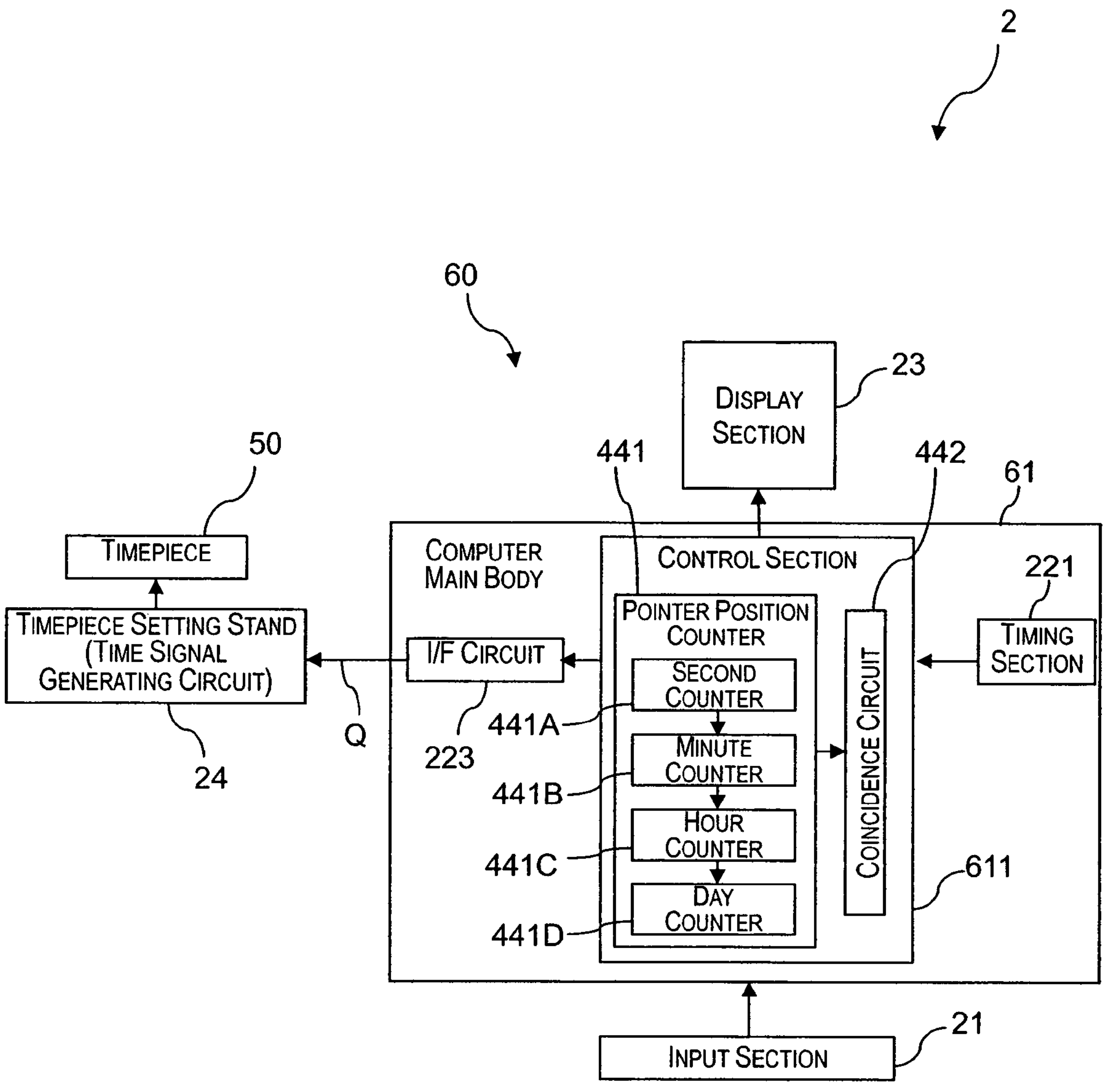
FIG. 8 is a block diagram showing the functions of a correction instruction device as a component of the date/time correction system in accordance with a second embodiment of the present invention.

FIG. 8 is a block diagram primarily showing the functions of the correction instruction device 60 of the date/time correction system 2. As shown in FIG. 8, the correction instruction device 60 has a keyboard 21; a computer main body 61 including a CPU, hard disk, or the like; a monitor 23 as a display section for displaying inputted characters and the like; and a cradle-style timepiece setting stand 24 in which the timepiece 50 is set.

The keyboard 21 functions as time input means (input section) whereby the pointed time data indicated by the pointers 16 and the date data indicated by the date disc 17 are inputted.

The computer main body 61 has a timepiece section 221 as timing means for timing the reference date/time data showing the date and time as a reference, a control section 611 for controlling the entire computer, and an interface circuit (I/F circuit) 223.

The control section 611 has a pointer position counter 441 and a coincidence circuit 442. The pointer position counter 441 and coincidence circuit 442 are not pieces of hardware residing inside the computer main body 61, but are obtained as control results produced by the use of software in a manner such that memory and other parts of the computer main body 61 are utilized for counting. The term "coincidence circuit 442" is not limited to hardware alone.

The pointer position counter 441 has a second counter 441A, a minute counter 441B, an hour counter 441C, and a day counter 441D and stores in memory the pointed time data (hour/minute/second) and the pointed date data (day) displayed by the timepiece 50 and inputted from the input section (keyboard) 21. The pointer position counter 441 counts up these stored pieces of instruction data as initial values. The day counter 441D performs forward counting when a correction instruction signal is outputted to the I/F circuit 223 from the pointer position counter 441.

The coincidence circuit 442 compares the reference date/time data counted by the timepiece section 221 and the value counted by the pointer position counter 441, and outputs a correction instruction signal based on the results of this comparison to the I/F circuit 223. Therefore, in the present embodiment, the correction instruction signal essentially constitutes time adjustment data. Thus, the control section 611 functions as a comparison section or comparison means. The present embodiment can be configured in a relatively simple manner by providing the pointer position counter 441 and the coincidence circuit 442 to the comparison means of the time correction instruction device 60 in a software-type configuration. Thus, the configuration of the timepiece 50 can be simplified because the time correction instruction device 60 has the pointer position counter 441 and the coincidence circuit 442.

The I/F circuit 223 inputs the correction instruction signal outputted from the 661, converts the signal to a data signal Q that can be externally outputted, and outputs this data signal Q to the timepiece setting stand 24.

The timepiece setting stand 24 is a cradle-style stand that functions as a communication section or communication means for outputting the data signal Q outputted from the I/F circuit 223 to the set timepiece 50. Although electromagnetic induction is used as the communication means in the present embodiment, it is also possible, for example, to use infrared data communication, communication through the electric connection from a USB (Universal Serial Bus), SCSI, or the like, optical communication, acoustic (ultrasonic) communication, and various other types of interfaces.

Figure 9:
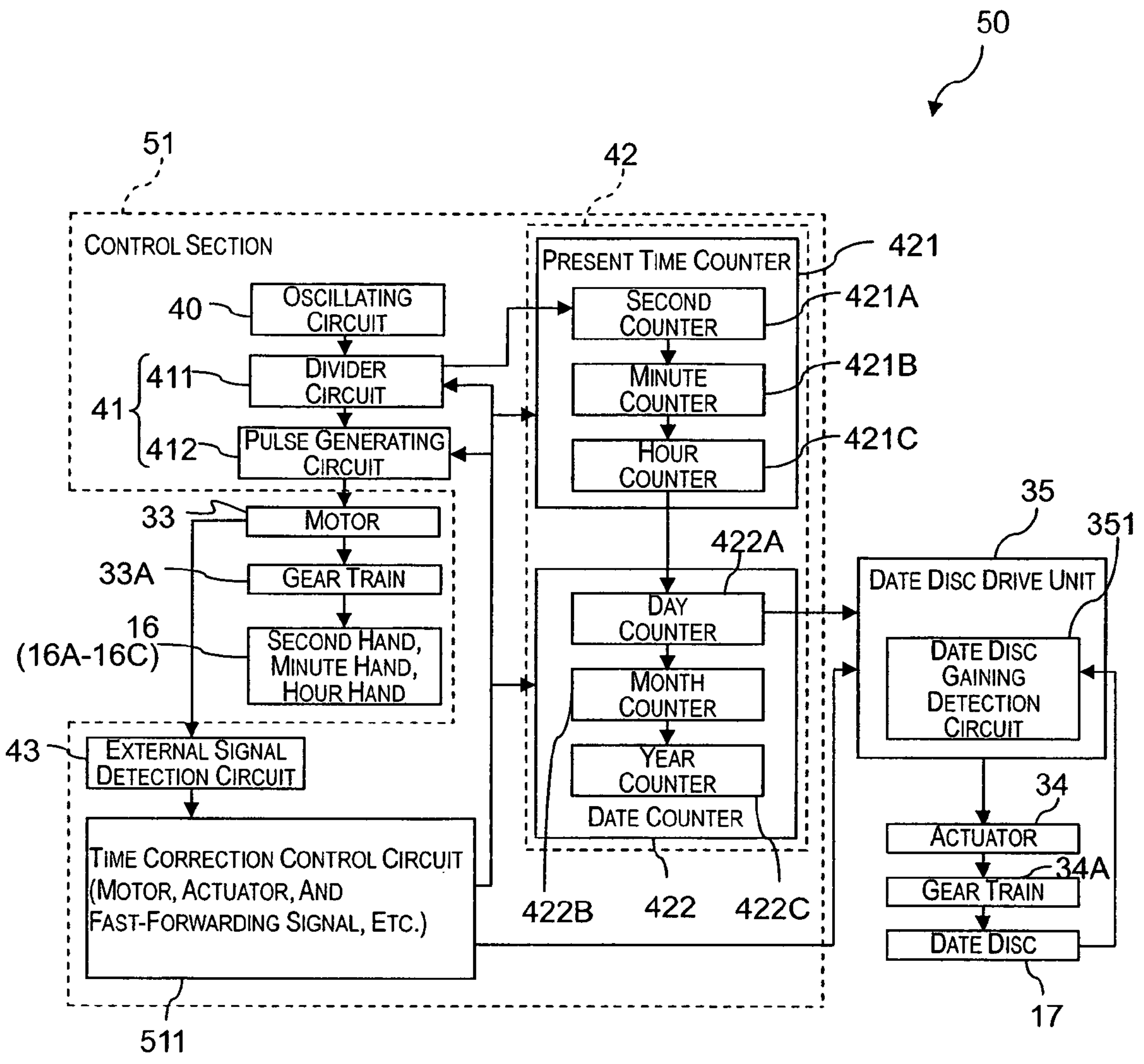
FIG. 9 is a block diagram showing the functions of the timepiece in accordance with the second embodiment of the present invention.

FIG. 9 is a block diagram showing the functions of the timepiece 50. As shown in FIG. 9, the timepiece 50 has the primary battery (not shown) previously described, a control section 51 for controlling the driving of the entire apparatus by electric power from the primary battery, a stepping motor 33 whereby the pointers 16 (16A–16C) for time display are rotated via a gear train 33A, a piezoelectric actuator 34 whereby the date disc 17 for date display is rotated via a gear train 34A, and a date disc drive unit 35 for receiving a drive control signal from the control section 51 and driving the piezoelectric actuator 34.

The control section 51 has an oscillating circuit 40, a drive control section or drive control means 41, a counter 42, an external signal detection circuit 43 as a communication section or communication means, and a time correction control circuit 511 as correction means.

The time correction control circuit 511 writes the pointed time data (hours/minutes/seconds) from the data received by the external signal detection circuit 43 into the present time counter 421 and outputs a correction instruction signal to the divider circuit 411 and pulse generating circuit 412, the pulse generating circuit 412 outputs a fast-forwarding pulse to the stepping motor 33 based on this correction signal instruction data, and the stepping motor 33 fast-forwards the pointers 16.

Also, the time correction control circuit 511 writes the year/month/day data of the reference date/time data from the data received by the external signal detection circuit 43 into the date counter 422, outputs a correction instruction signal to the date disc drive unit 35, and fast-forwards the date disc 17 by the piezoelectric actuator 34 based on this correction instruction signal. The date disc gaining detection circuit 351 herein detects the driving of the date disc 17. Since the date disc 17 is set to be fast-forwarded by the date disc drive unit 35, the years and months written into the date counter 422 are set as the previous months of the pointed date data when the values of the pointed date data is greater than the values of the reference date data. Setting the device in this manner eliminates the need for the operator to determine the input of the previous month and makes it possible to improve operability.

Figure 10:
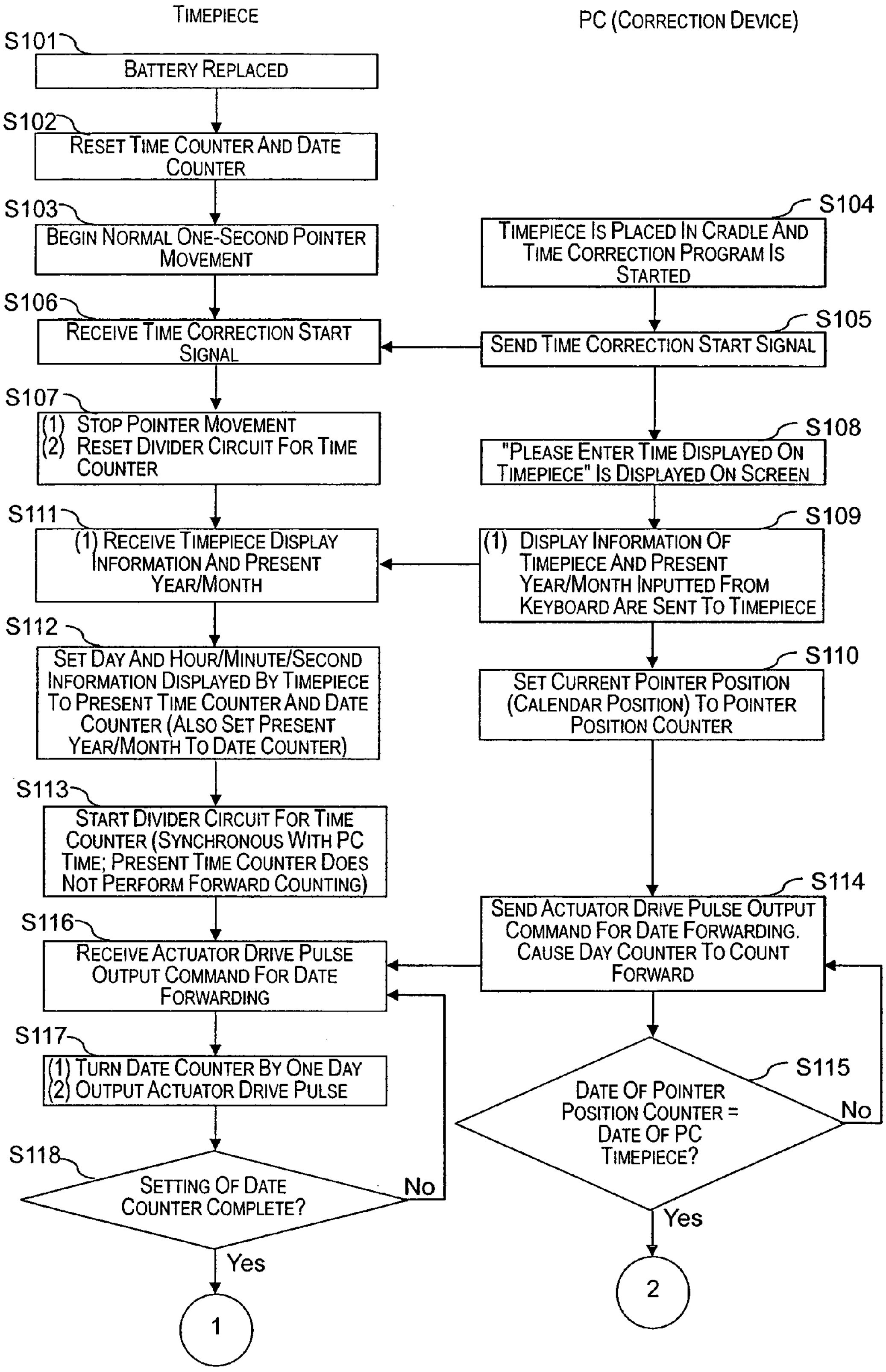
FIG. 10 is a flowchart showing the procedure of date/time correction in the date/time correction system in accordance with the second embodiment of the present invention.
Figure 11:
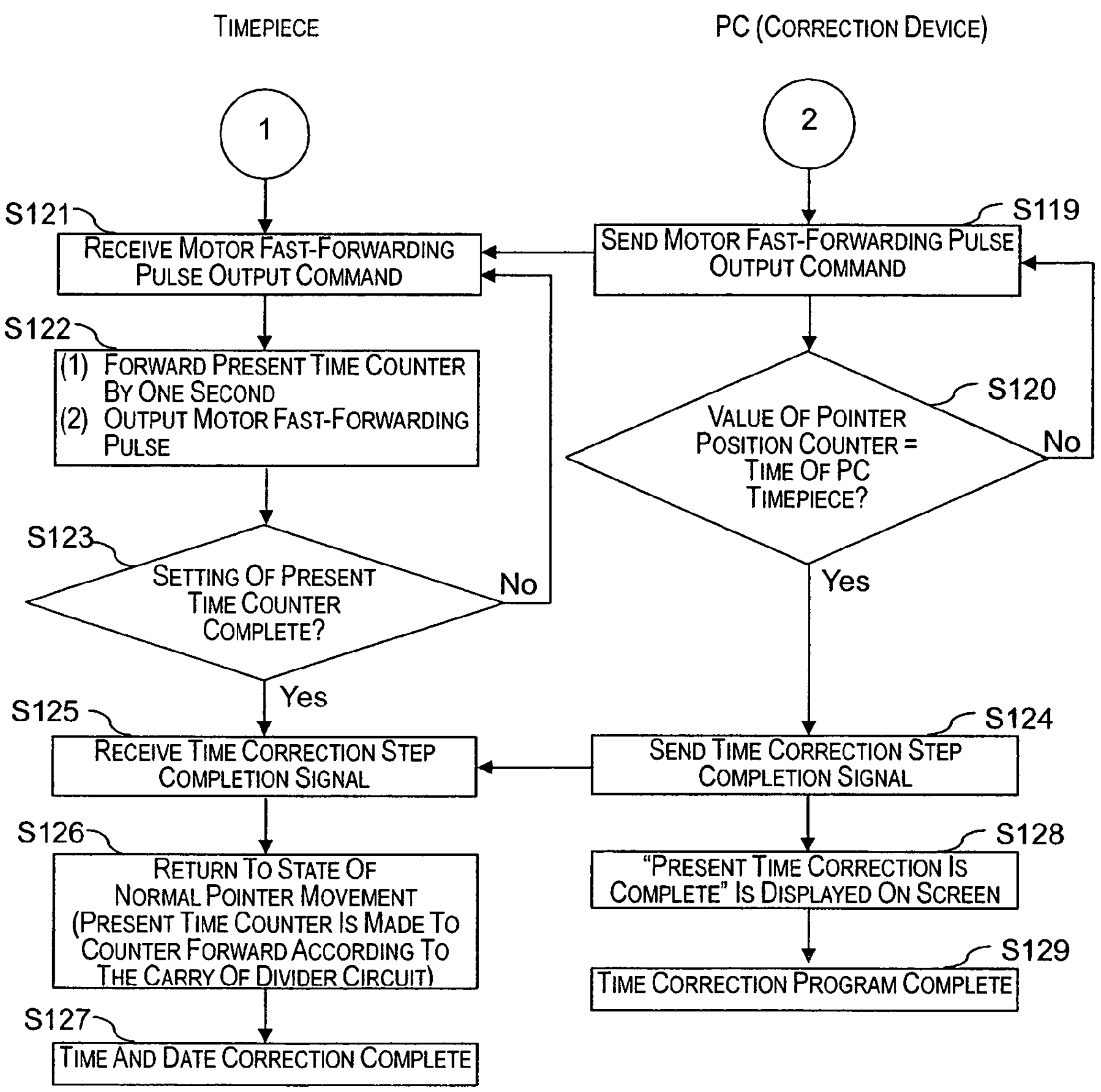
FIG. 11 is a flowchart showing the procedure of date/time correction in the date/time correction system in accordance with the second embodiment of the present invention.

FIGS. 10 and 11 are flowcharts showing the procedure of date/time correction. First, the operator in the timepiece store removes the back lid of the timepiece 50, takes out the primary battery from the inside, and replaces the battery with a new battery (step S101). The present time counter 421 and date counter 422 are reset simultaneously with this battery replacement (step S102), and the timepiece 50 begins pointer movement in one-second increments (step S103) in the usual manner.

Next, the operator sets the timepiece 50 in the timepiece setting stand 24 and starts up the date/time correction program of the correction instruction device 20 (step S104), whereupon a signal for starting date/time correction is sent by the correction instruction device 20 to the timepiece 50 through the timepiece setting stand 24, which is a communication section or communication means (step S105). The signal for starting date/time correction is received by the external signal detection circuit 43 in the timepiece 50 (step S106), the pointer movement stops, and the divider circuit 411 for counting 1-Hz increments is reset (step S107).

Next, the words "Please enter the time and date displayed on the timepiece" are displayed on the monitor 23 in the correction instruction device 60 (step S108). In response to this prompt, the operator uses the keyboard 21 to input the pointed time data (hours/minutes/seconds), which is the displayed time of the timepiece 50, and the pointed date data (display information), which is the displayed date (time input procedure).

Next, the pointed time data (hour/minute/second) and pointed date data (day) of the timepiece 50 inputted with the keyboard 21 in the correction instruction device 60, and the year/month data of the reference date/time data counted by the timepiece section 221 are sent to the timepiece 50 (step S109: communication procedure). The pointed time data (hour/minute/second) and pointed date data (days) sent to the timepiece 50 are then inputted to the pointer position counter 441 (step S110).

The external signal detection circuit 43 in the timepiece 50 receives the reference date/time data (year/month) and the pointed date data (day) or the pointed time data (hour/minute/second), outputted from the correction instruction device 60 (step S111:receiving procedure). The pointed time data (hour/minute/second) is then set by the present time counter 421 in the timepiece 50 by means of the time correction control circuit 511, and the pointed date data (day) and reference year/month data (year/month) are set by the date counter 422 (step S112).

Next, in the timepiece 50, the divider circuit 411 for counting 1 Hz (seconds) starts and synchronizes with the count-up timing of the correction instruction device 60 by means of the time correction control circuit 511. The present time counter 421 does perform forward counting (step S113).

The reference date/time data of the timepiece section 221 in the correction instruction device 60, and the pointed date/time data of the pointer position counter 441 are compared in the coincidence circuit 442, and a pulse (piezoelectric actuator drive pulse output command) for driving the piezoelectric actuator 34, which is a correction instruction signal based on the results of this comparison, is sent to the external signal detection circuit 43 of the timepiece 50 via the I/F circuit 223 and timepiece setting stand 24, while the day counter 441D is made to perform a forward count (step S114:comparison procedure, communication procedure). This operation is repeated until the value of the day counter 441D of the pointer position counter 441 and the value of the date of the reference date/time data timed by the timepiece section 221 coincide (step S115).

The motor coil 331 of the stepping motor 33 and the external signal detection circuit 43 of the timepiece 50 receive the piezoelectric actuator drive pulse output command (step S116: receiving procedure). The piezoelectric actuator drive pulse output command thus received is then outputted to the date disc drive unit 35 by the time correction control circuit 511, the piezoelectric actuator 34 is driven by the date disc drive unit 35 to turn the date disc 17, and the day counter 422A of the date counter 422 is simultaneously turned by one day (step S117: correction procedure). These operations are performed every time the piezoelectric actuator drive pulse output command is received (step S118).

Next, the reference time data of the timepiece section 221 in the correction instruction device 60, and the instruction time data of the pointer position counter 441 are compared in the coincidence circuit 442, and a pulse (motor fast-forwarding pulse output command) for driving the stepping motor 33, which is a correction instruction signal based on the results of this comparison, is sent to the external signal detection circuit 43 of the timepiece 50 via the I/F circuit 223 and timepiece setting stand 24 (step S119: comparison procedure, communication procedure). This operation is repeated until the values of the second counter 441A, the minute counter 441B, and the hour counter 441C of the pointer position counter 441 coincide with the value of the reference time kept by the timepiece section 221 (step S120).

The motor coil 331 of the stepping motor 33 and the external signal detection circuit 43 (step S121: receiving procedure) in the timepiece 50 receive the motor fast-forwarding pulse output command. The motor fast-forwarding pulse output command thus received is then outputted to the pulse generating circuit 412 by the time correction control circuit 511, and the stepping motor 33 is driven to fast-forward the pointers 16 by the pulse generating circuit 412, while the second counter 421A of the present time counter 421 is turned by one second (step S122: correction procedure). These operations are performed every time a motor fast-forwarding pulse output command is received (step S123).

Next, a date/time correction step completion signal is sent to the timepiece 50 in the correction instruction device 60 if the transmission of motor fast-forwarding pulse output commands is complete (step S124). This date/time correction completion signal is then received by the timepiece 50 (step S125), resulting in a state of normal pointer movement, or, specifically, a state wherein counting by the present time counter 421 begins based on 1-Hz pulses outputted from the divider circuit 411 (step S126). The time and date correction of the timepiece 50 is thus completed (step S127).

The words "Present time correction is complete" are displayed on the monitor 23 in the correction instruction device 60 after the date/time correction step completion signal is sent to the timepiece 50 (step S128), and the time correction program is completed (step S129). Finally, the operator separates the timepiece 10 from the state of communication state with the timepiece setting stand 24, sets the next timepiece into the timepiece setting stand 24, and corrects the time and date again. The procedures performed by the timepiece 50 or correction instruction device 60 are configured as programs that are run by a computer.

According to the present embodiment, the following effects can be further obtained in addition to substantially the same effects as those listed as (1) to (5) in the first embodiment.

(6) Equipping the correction instruction device 60 with the pointer position counter 441 allows the timepiece 50 to be manufactured at low cost and to be made smaller in size and weight.

(7) The timepiece 50 can be made smaller and less expensive, and the number of components can be increased only minimally without the need to incorporate receiver antenna elements or other such new components into the timepiece 50 due to the fact that data can be received with the motor coil 331 of the stepping motor 33 and that correction means is incorporated into the IC component of the timepiece 50.

The present invention is not limited to the embodiments previously described and includes other configurations and modifications whereby the objectives of the present invention can be achieved, and modifications such as those shown below can also be made in the present invention.

Figure 12:
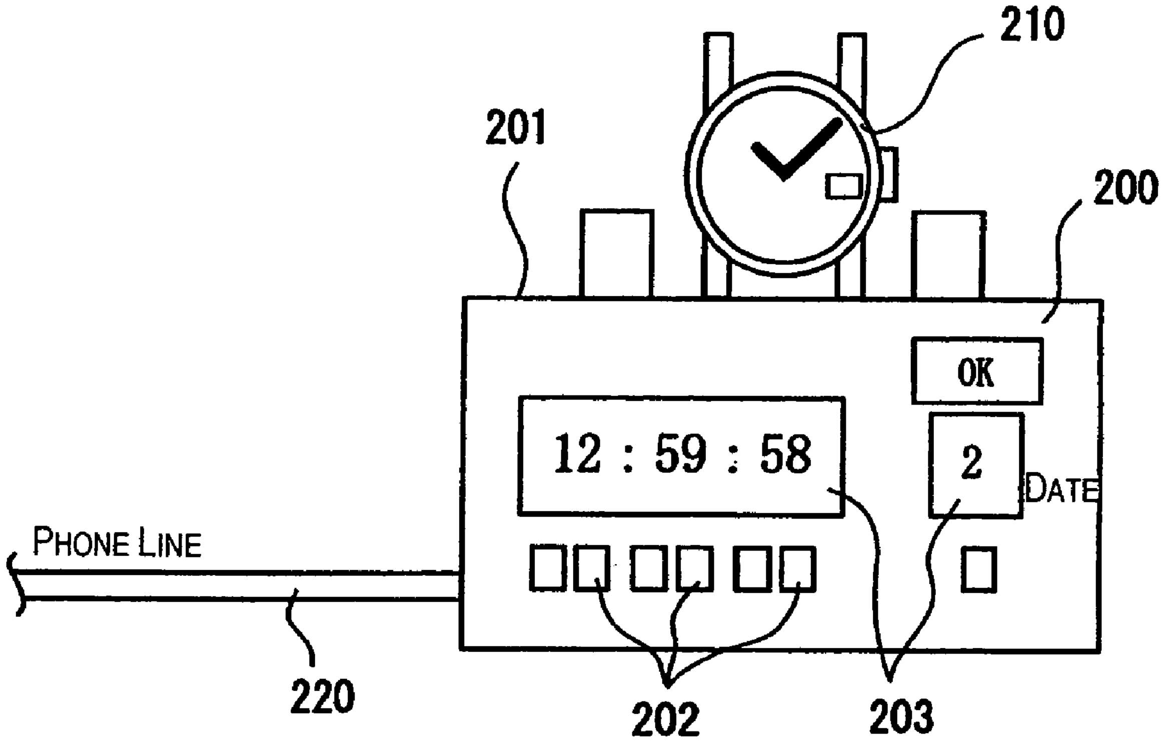
FIG. 12 is a diagram showing an alternative embodiment of the present invention.

In the embodiments previously described, the correction instruction device comprises a computer, but the device is not limited to this option alone and can, for example, contain a time correction instruction device 200 as shown in FIG. 12. Specifically, in the time correction instruction device 200, the top surface is formed into a setting stand 201 in which a timepiece 210 can be set, and the front surface is provided with operation buttons 202 for inputting instruction time for each set of two digits, and a display screen 203 for displaying the values inputted by the operation buttons 202. Also, a common phone line 220 may be connected to the time correction instruction device 200, and the time correction instruction device 200 may, for example, correct the timepiece installed in the correction instruction device by calling a number for obtaining time information, such as "117" in Japan, and obtaining the accurate time by voice recognition. As described above, the time of the timepiece 210 can be corrected by comparing the pointed time data that has been inputted with the time data in the time correction instruction device 200 corrected via this phone line, and determining the difference thereof. The time can be corrected in this case.

The correction instruction device obtains reference time through such a phone circuit, but the correction instruction device is not limited to this option alone and may also be configured, for example, by utilizing a service wherein the time information is included in the electromagnetic waves of a portable phone, or being allowed to function as an electromagnetic wave timepiece. Also, an Internet time information service may also be utilized, such as one in which information about Japan standard time is provided by the Communications Research Laboratory. Furthermore, a phone line may be connected to obtain standard time, but there is no need to connect the phone line and the date can be corrected if the operator can directly correct the time of the correction instruction device.

In the embodiments previously described, a pointer type timepiece having a date display function that uses a date disc was employed, but the pointer type timepiece is not limited to this option alone and may, for example, not have a function for displaying the date but only displays time by pointers. A timepiece whose date display function does not depend on a date disc, but, for example, has pointers and a liquid crystal screen or the like, is also included in the range of the present invention. A timepiece with no second hand is also included in the range of the present invention. It is also possible to employ a circular plate-shaped timepiece marked with gradations for the hour hand, minute hand, or the like.

In the embodiments previously described, a primary battery was used to supply power, but, for example, a solar charging configuration, an automatic winding configuration, an external charging configuration that draws power from the correction instruction device, or another such secondary power source (secondary battery) may also be employed. The secondary battery is a battery that stores energy generated by a power generator. In this case, since the battery 31 does not need to be replaced, there is no need to open the back lid, and operating efficiency can be improved. In other words, operability can be improved by providing such a secondary battery because there is no need to open and close the back lid when the charging voltage decreases, the pointers stop, the battery is charged, and the date and time are corrected.

Electromagnetic induction was employed in the communication between the timepiece and the correction instruction device, but the communication need not be limited to this option alone, and may, for example, include optical communication, ultrasonic communication, or another such communication means. In the former case, a solar battery can be used in the optical sensor, there is no need to provide a new sensor to the timepiece, and miniaturization and other improvements are not adversely affected when, for example, solar energy is used to provide power. The latter case has merits in that a drive detection terminal of a piezoelectric actuator for driving the date disc can be utilized as the sensor. Acoustic elements other than ultrasonic elements may be used, and the timepiece can be equipped with a buzzer in this case.

Also, the computer main body and the timepiece setting stand are electrically connected, but, for example, an existing USB connection or SCSI connection can be employed for this type of connection, and a wireless connection for infrared communication or another such connection may also be employed.

Also, in the embodiments previously described, the data signal was sent in one direction from the correction instruction device to the timepiece, but the configuration is not limited to this option alone and may, for example, have a function whereby data is sent from the timepiece to the correction instruction device. This case has advantages in that if the correction instruction device can be notified that the time correction of the timepiece has been completed, the time can be corrected even more accurately because the value of the present time counter in the timepiece can be directly read.

In the present invention, the input section or input means for the time and date is not limited to a keyboard, and may be a camera that recognizes the hour and minute pointers and the date indicated by the timepiece. For example, a camera for pointer recognition may be provided to the timepiece setting stand, the camera may photograph the timepiece and recognize the time and date indicated by the timepiece by image recognition, and the result may be used as pointed time data for time correction control. Since the use of such means eliminates the need for the operator to input instruction time, the time of the timepiece can be corrected even more simply, operating efficiency is improved, and the time correction system is easier to use.

Figure 13:
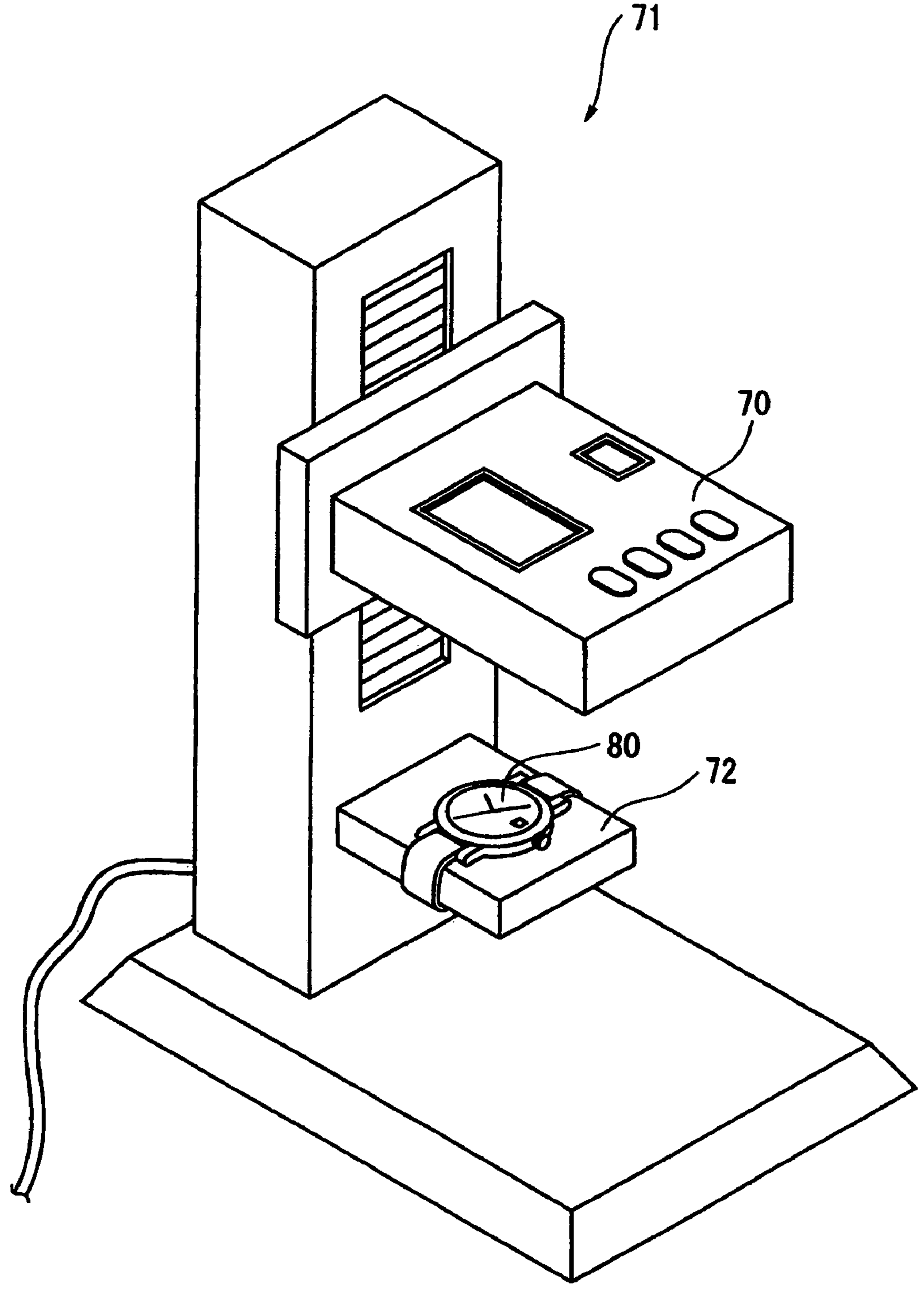
FIG. 13 is a perspective view showing an alternative embodiment of the present invention.

Specifically, as shown, for example, in FIG. 13, a camera 70 using a CCD (charge-coupled device) is fixed to a camera support stand 71 in a vertically movable manner, a timepiece 80 set in the lower end of a timepiece setting stand (cradle) 72 is photographed by the camera 70, the photographed image data is sent to a computer main body (not shown) and processed by an image processing program, and the seconds, minutes, hours, and date indicated by the timepiece 80 are recognized. In this type of image recognition, the direction of the dial can be determined from the positional relationship between the pointers, the markings, the gradations, and the like by the brightness of the time display section, and the markings and characters (numbers) of the date can also be identified by pattern recognition or the like.

Figure 14:
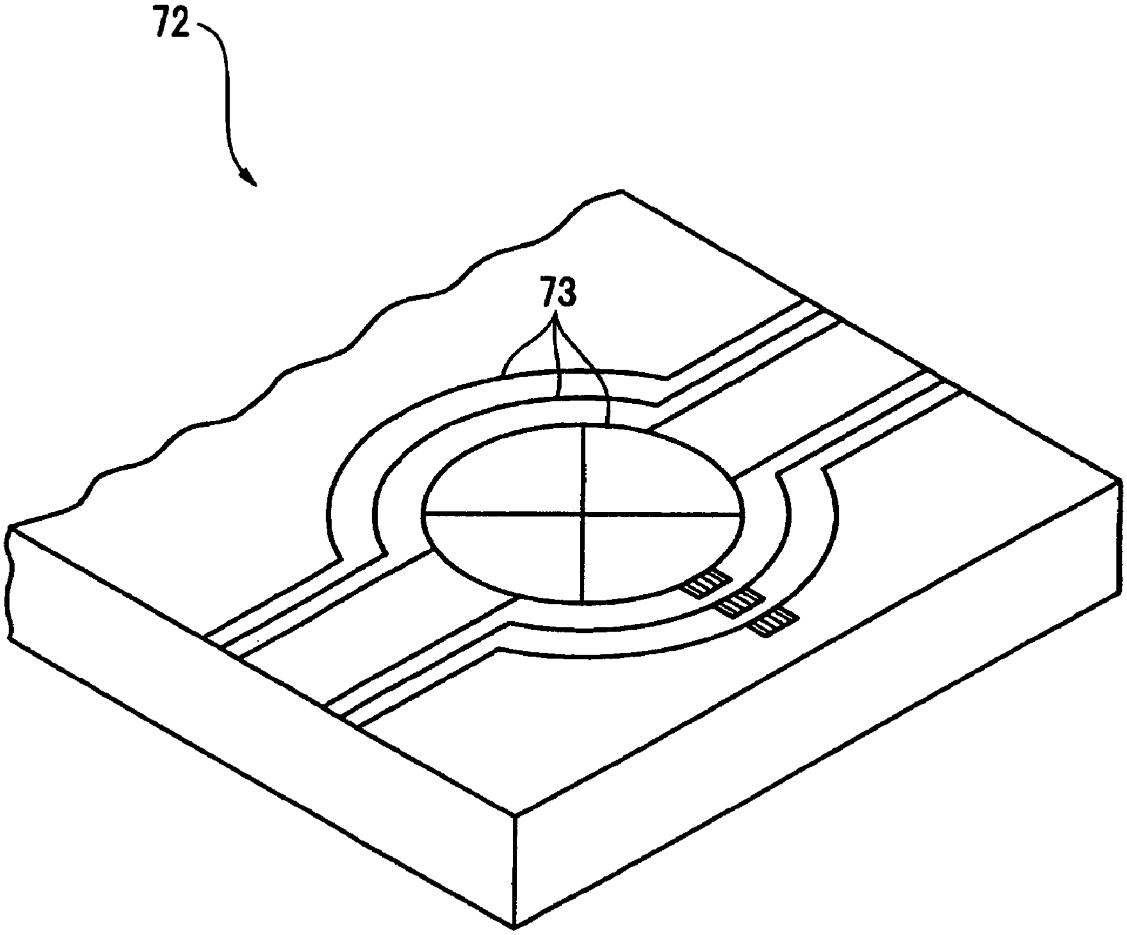
FIG. 14 is a perspective view showing an alternative embodiment of the present invention.
Figure 15:
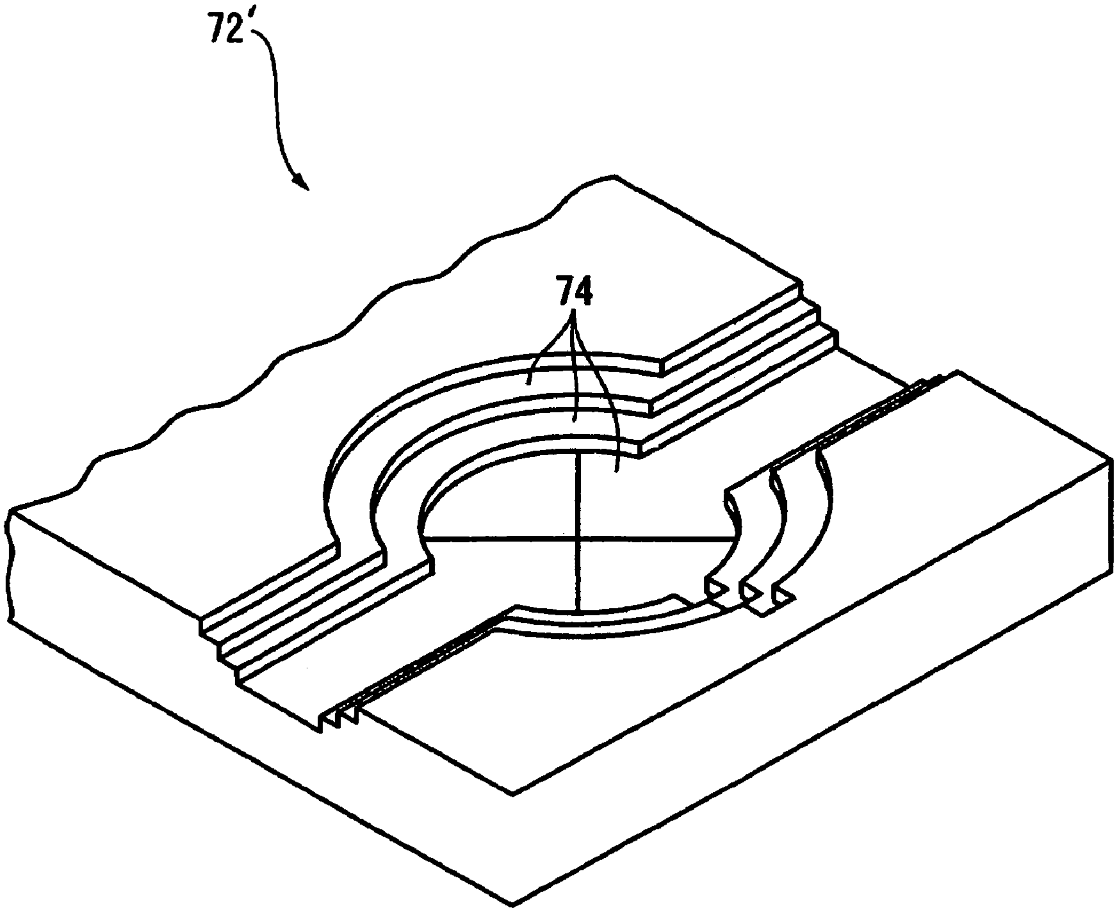
FIG. 15 is a perspective view showing an alternative embodiment of the present invention.
Figure 16:
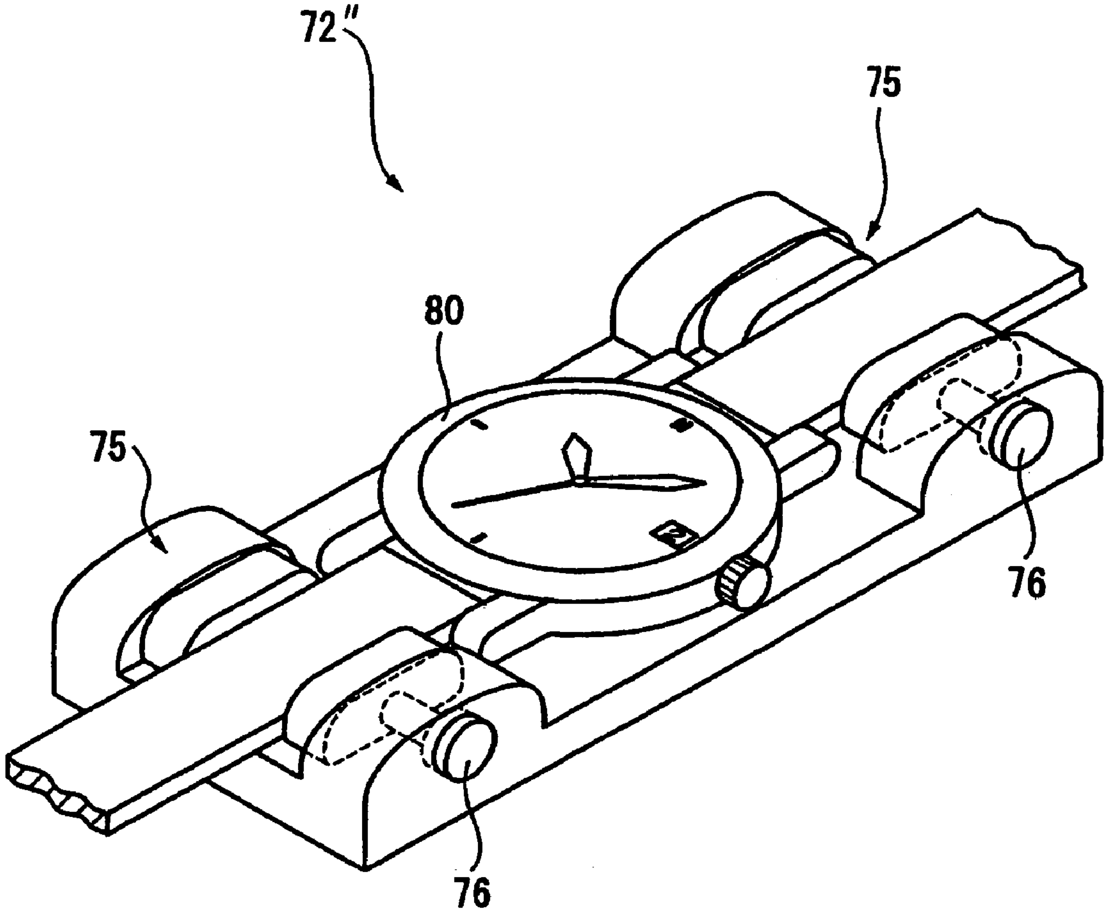
FIG. 16 is a perspective view showing an alternative embodiment of the present invention.

Also, as shown in FIG. 14, a plurality of setting marks 73 corresponding to the outer shape of the timepiece may be set on the timepiece setting stand 72, or a plurality of grooved steps 74 as shown in the timepiece setting stand 72' in FIG. 15 may be provided, whereby the direction of the dial is always kept the same, the center of the dial remains in the same position, and the precision of pointer and date recognition is improved even when timepieces of different size are set. In addition, as shown in the timepiece setting stand 72" in FIG. 16, a pressure mechanism 75 capable of holding the band section of the timepiece 80 by applying equal pressure to both sides may be provided, the timepiece 80 can easily be attached and removed by the operation of buttons 76, the timepiece may be set in a state in which the 12:00 and 6:00 directions are always aligned, and recognition precision can be improved.

When such a camera is used, the direction of the dial and the angle of the pointers must be known to read the time. In either case the center of the dial must first be known, but finding the intersecting point of the three pointers or two pointers (when there is no second hand) to obtain this information would be sufficient and can easily be recognized from the image data.

Next, to determine the 12:00 direction, the center of the markings or gradations nearest to the ideal 12:00 position can be assumed to be the 12:00 position because the timepiece can be set in a substantially constant position by using any one or a combination of the timepiece setting stands 72 through 72" shown in FIGS. 14 and 15. Specifically, the actual 12:00 position θ0 can be reliably identified by identifying the center of the nearest gradation 83 through image processing even when the actual 12:00 position θ0 is misaligned from the ideal 12:00 position, as shown in FIG. 17.

Figure 17:
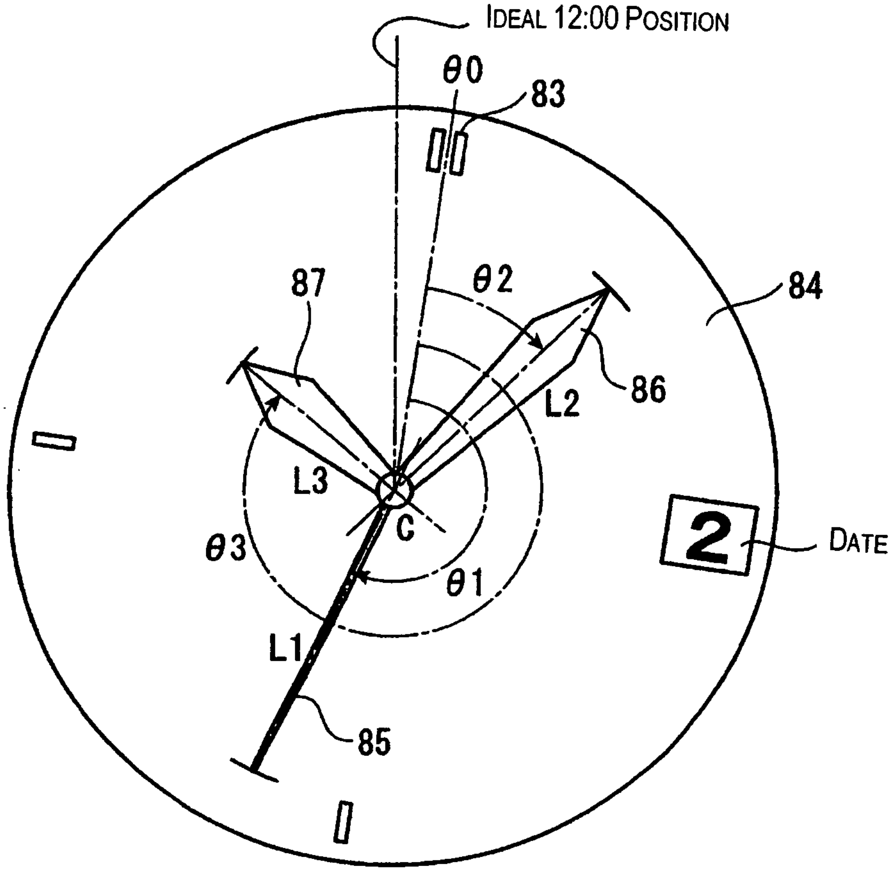
FIG. 17 is a plan view showing an alternative embodiment of the present invention.
Figure 18:
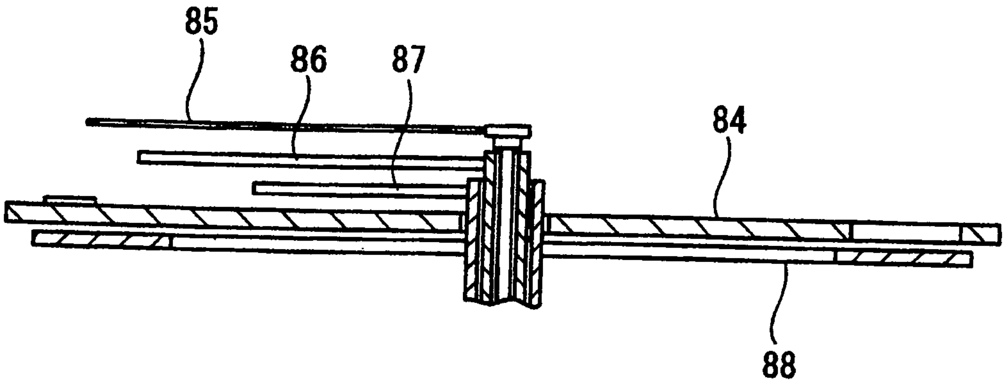
FIG. 18 is a perspective view showing an alternative embodiment of the present invention.

Next, to be able to identify various types of pointers in a three-pointer configuration in FIG. 17, it is necessary for the second hand 85, minute hand 86, and hour hand 87 to be distinguishable in order of their lengths L1 to L3 from the center C of the dial 84 (intersecting point of pointers) to the ends of the pointers. As described above, the time can be identified if the angle θ1 from the 12:00 position θ0 to the second hand 85, the angle θ2 to the minute hand 86, and the angle θ3 to the hour hand 87 can be read. For the date, characters should be read in the 3:00 direction or the 6:00 direction. However, since the date can also be displayed in other positions, using a display in which the date disc 88 on which the date is printed is in a lower position than the dial 84 (farther from the camera 70) makes it possible to recognize the display position of the date section by the difference in focal positions when the photograph is taken with a camera whose focal position is varied, as shown, for example, in FIG. 18.

Furthermore, recognition is sometimes not possible with the recognition algorithm (image processing program) described above in a timepiece having a display section with a special design, in which case recognition algorithms designed specifically for each timepiece should be prepared and set up such that these algorithms can be automatically switched by inputting the model name (the so-called reference number) of the timepiece.

Also, the positions of each section can be reliably identified without affecting the outward design or switching the recognition algorithm even in a timepiece with a specially designed display section if markings are created by applying an infrared coating or another such invisible coating to the 12:00 position on the dial, part of the pointers, the display section of the date, or the like.

When the hour hand and the minute hand overlap to make the shorter hour hand difficult to see, it can be concluded that the hour hand is superposed on the minute hand because only the minute is seen, but even in this case the time can be determined without interference by assuming that the angles θ3 and θ2 shown in FIG. 17 are approximately equal to each other. An error may still occur in identifying the position of the hour hand in this case, but no precision-related problems will be encountered in identifying the actual position because the hour hand shows the same time across wide range of indications that spans an angle of 5 degrees. It is apparent that the position of the hour hand can be accurately determined by calculating the position of the hour hand from the position of the overlapping minute hand if it is determined that the pointers are overlapping each other.

In the embodiments previously described, the date disc was driven using a piezoelectric actuator, but the driving is not limited to this option alone and may be done using a stepping motor or other type of motor.

In the embodiments previously described, the pointers for indicating the seconds, minutes, and hours were driven by a stepping motor, and the date disc for indicating the date was driven by a piezoelectric actuator, but the drive system is not limited to this option alone and the seconds through the date may all be driven by a single stepping motor. Also, the second hand and the hour/minute hands may be configured to be driven by separate drive devices.

In the embodiments previously described, the piezoelectric actuator for driving the date disc could rotate in only one direction, but it is apparent that a piezoelectric actuator that rotates in both directions (display is changed also so that the date reverses) may also be used.

The above description was also made with reference to sending a signal to advance the date disc or second hand in single-step increments until the comparison results coincide, but the configuration is not limited to this option alone and may, for example, be designed such processing is performed by a CPU or the like to send a single signal for performing a drive that corresponds to several steps obtained by combining such signals. In this case, the timepiece must be provided with a counter for managing the number of steps sent.

Also, the present invention can, for example, be implemented through the following aspects. Specifically, the present invention can be a computer-executable program for correcting the readings of the pointers in a pointer type timepiece having at least pointers for displaying the time by using a time correction instruction device having at least reference time data as a reference, wherein this program comprises a time input procedure for inputting pointed time data indicated by the pointers of the pointer type timepiece, a comparison procedure for comparing the inputted pointed time data and reference time data kept by timing means, a communication procedure for outputting a correction instruction signal based on the results of this comparison to the pointer type timepiece, a receiving procedure for receiving the outputted correction instruction signal in the pointer type timepiece, and a correction procedure for matching the readings of the pointers with the reference time data based on the received correction instruction signal.

Also, the present invention can be a computer-executable program for correcting the readings of the pointers in a pointer type timepiece having at least pointers for displaying the time by using a time correction instruction device having at least reference time data as a reference, wherein this program comprises a time input procedure for inputting pointed time data indicated by the pointers of the pointer type timepiece, a communication procedure for outputting the reference time data and pointed time data to the pointer type timepiece, a receiving procedure for receiving the outputted data in the pointer type timepiece, a comparison procedure for comparing the received reference time data and pointed time data, and a correction procedure for matching the readings of the pointers with the reference time data based on the comparison results from the comparison procedure.

According to the program described above, for example, the user of a timepiece can utilize a communication circuit or the like to download data and perform correction operations as a result of the fact that the time correction instruction device is configured using a computer. A configuration for downloading data that corresponds to the model of the timepiece can also be used in this case.

Also, for example, the time correction instruction device can be configured using an input terminal as a client device that receives the time indicated by the pointers, and a server connected to this input terminal, and can also be configured such that the functions of the comparison means, correction means, and the like are performed by the server. In this case, for example, the server can manage the correction history and other characteristics of each timepiece.

In addition, the specific structure, shape, and other attributes of the embodiments of the present invention may be structured differently within a range that allows the objects of the present invention to be attained.

According to the present invention, the instruction time is automatically corrected in a time correction instruction device and a pointer type timepiece merely by inputting the instruction time of the pointer type timepiece while the pointer type timepiece and the time correction instruction device are kept in communication with each other. This has the effects of enabling the operator to easily correct the time without operating winders, buttons, or the like, and making it possible to efficiently perform operations even when there are many timepieces to be corrected.

Also, since the pointer type timepiece is provided solely with communication means (and comparison means) for receiving data, the timepiece can be prevented from becoming larger or more expensive, and there is no need to make significant changes to the outer visible configuration of the timepiece, as opposed to providing a liquid crystal device or the like.

The term "configured" as used herein to describe a component, section or part of a device includes hardware and/or software that is constructed and/or programmed to carry out the desired function.

As used herein, the following directional terms "forward, rearward, above, downward, vertical, horizontal, below and transverse" as well as any other similar directional terms refer to those directions of the time correction system, the time correction instruction device, and the pointer type timepiece equipped with the present invention. Accordingly, these terms, as utilized to describe the present invention should be interpreted relative to the time correction system, the time correction instruction device, and the pointer type timepiece equipped with the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-191996. The entire disclosure of Japanese Patent Application No. 2003-191996 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A time correction system comprising:
a pointer type wristwatch including
at least one pointer configured to display time,
a communication section configured to receive time adjustment data,
a drive control section configured to control driving of said at least one pointer, and
a correction section configured to operate said drive control section based on said time adjustment data; and
a time correction instruction device including
a timing section configured to keep time as reference time data,
a time input section configured to input pointed time data corresponding to time indicated by said at least one pointer of said pointer type wristwatch,
a communication section configured to output said time adjustment data to said pointer type wristwatch, and
a comparison section configured to compare said reference time data and the pointed time data, and
said communication section of said time correction instruction device being configured to output a correction instruction signal obtained based on a comparison result between said reference time data and said pointed time data by said comparison section as said time adjustment data to said communication section of said pointer type wristwatch.

2. The time correction system as recited in claim 1, wherein
said comparison section includes
a pointer position counter configured to store said pointed time data input by said input section as an initial value and adjust said pointed time data to an updated value, and
a coincidence circuit configured to output said correction instruction signal based on a comparison result between reference time data and the updated value counted by said pointer position counter.

3. The time correction system as recited in claim 1, wherein
said drive control section and said communication section of said pointer type wristwatch are at least partially formed by a motor with a motor coil that is configured to drive said at least one pointer and that is configured to receive said time adjustment data or said correction instruction signal from said time correction instruction device.

4. The time correction system as recited in claim 1, wherein
said pointer type wristwatch includes a battery for supplying electricity to drive said drive control section.

5. The time correction system as recited in claim 1, wherein
said time correction instruction device includes a computer, and said time input section includes a keyboard.

6. The time correction system as recited in claim 1, wherein
said at least one pointer includes at least one of an hour hand, a minute hand, and a date indicator, and
said time input section is further configured to input at least one of hour, minute and date pointed by said hour hand, minute hand and date indicator, respectively, as said pointed time data.

7. A time correction system comprising:
a pointer type timepiece including
at least one pointer configured to display time,
a communication section configured to receive time adjustment data,
a drive control section configured to control driving of said at least one pointer, and
a correction section configured to operate said drive control section based on said time adjustment data; and
a time correction instruction device including
a timing section configured to keep time as reference time data,
a time input section configured to input pointed time data corresponding to time indicated by said at least one pointer of said pointer type timepiece, and
a communication section configured to output said time adjustment data to said pointer type timepiece,
one of said pointer type timepiece and said time correction instruction device further including a comparison section configured to compare said reference time data and the pointed time data
said drive control section and said communication section of said pointer type timepiece being at least partially formed by a motor with a motor coil that is configured to drive said at least one pointer being configured to receive said time adjustment data from said time correction instruction device.

8. A time correction system comprising:
a pointer type timepiece including
at least one pointer configured to display time,
a communication section configured to receive time adjustment data,
a drive control section configured to control driving of said at least one pointer, and
a correction section configured to operate said drive control section based on said time adjustment data; and
a time correction instruction device including
a timing section configured to keep time as reference time data,
a time input section configured to input pointed time data corresponding to time indicated by said at least one pointer of said pointer type timepiece, said time input section having a camera configured to produce an image data of said at least one pointer of said pointer type timepiece to obtain said pointed time data, and
a communication section configured to output said time adjustment data to said pointer type timepiece,
one of said pointer type timepiece and said time correction instruction device further including a comparison section configured to compare said reference time data and said pointed time data.

9. The time correction system as recited in claim 8, wherein said at least one pointer includes at least one of an hour hand, a minute hand, and a date indicator, and
said time input section is further configured to input at least one of hour, minute and date pointed by said hour hand, minute hand and date indicator, respectively, as said pointed time data.

10. A pointer type wristwatch comprising:
at least one pointer being configured to display time;
a communication section being configured to receive time adjustment data from a time correction instruction device in which said time adjustment data is at least partially based on pointed time data corresponding to time indicated by said at least one pointer, said communication section being configured to receive a correction instruction signal from outside said pointer type wristwatch as said time adjustment data based on a comparison result between reference time data and said pointed time data corresponding to time indicated by said at least one pointer such that a correction section adjusts said position of said at least one pointer based on said correction instruction signal; and a drive control section being configured to control driving of said at least one pointer, said correction section being configured to adjust a position of said at least one pointer based on said time adjustment data.

11. A time correction instruction device for correcting time displayed in a pointer type wristwatch with at least one pointer based on reference time data, comprising:

a timing section configured to count said reference time data;

a time input section configured to input pointed time data corresponding to time indicated by said at least one pointer of said pointer type wristwatch;

a communication section configured to output time adjustment data to said pointer type wristwatch with said time adjustment data including a correction instruction signal based on a comparison result between said reference time data and said pointed time data; and a comparison section being configured to compare said reference time data timed by said timing section and said pointed time data input by said time input section such that the communication section outputs said correction instruction signal based on the comparison result in said comparison section.

12. The time correction instruction device as recited in claim 11, wherein said communication section is configured to output said reference time data and said pointed time data to said pointer type wristwatch.

13. A time correction method for correcting time indicated by at least one pointer of a pointer type wristwatch utilizing a time correction instruction device having reference time data, comprising:

inputting pointed time data corresponding to a time indicated by said at least one pointer of said pointer type wristwatch into said time correction instruction device;

communicating time adjusting data from said time correction instruction device to said pointer type wristwatch, said communicating of said time adjusting data including communicating a correction instruction signal from said time correction instruction device to said pointer type wristwatch after comparing of said reference time data and said pointed time data;

comparing said reference time data and said pointed time data in said time correction instruction device to produce said correction instruction signal; and adjusting a position of said at least one pointer based on the correction instruction signal.

* * * * *